US008811667B2

(12) United States Patent
Kasahara

(10) Patent No.: US 8,811,667 B2
(45) Date of Patent: Aug. 19, 2014

(54) TERMINAL DEVICE, OBJECT CONTROL METHOD, AND PROGRAM

(75) Inventor: Shunichi Kasahara, Kanagawa (JP)

(73) Assignee: Sony Corporation, Tokyo (JP)

( * ) Notice: Subject to any disclaimer, the term of this patent is extended or adjusted under 35 U.S.C. 154(b) by 165 days.

(21) Appl. No.: 13/431,540

(22) Filed: Mar. 27, 2012

(65) Prior Publication Data

US 2012/0250940 A1 Oct. 4, 2012

(30) Foreign Application Priority Data

Mar. 31, 2011 (JP) .................. 2011-078075

(51) Int. Cl.
*G06K 9/00* (2006.01)
*H04N 5/225* (2006.01)
(52) U.S. Cl.
USPC ..................................... 382/103; 348/169
(58) Field of Classification Search
USPC .......... 382/103, 107, 236; 348/152, 169, 170, 348/171, 172, 352, 154, 155; 345/630, 632, 345/633, 649
See application file for complete search history.

(56) References Cited

U.S. PATENT DOCUMENTS

| 6,801,216 | B2* | 10/2004 | Voticky et al. | 345/630 |
| 7,124,053 | B2* | 10/2006 | Tanaka et al. | 702/152 |
| 7,272,489 | B2* | 9/2007 | Tu | 701/438 |
| 7,613,356 | B2* | 11/2009 | Uchiyama et al. | 382/271 |
| 8,315,432 | B2* | 11/2012 | Lefevre et al. | 382/103 |

FOREIGN PATENT DOCUMENTS

JP 2010-238098 10/2010

* cited by examiner

*Primary Examiner* — Abolfazl Tabatabai
(74) *Attorney, Agent, or Firm* — Sherr & Jiang, PLLC

(57) ABSTRACT

An apparatus is disclosed comprising a memory storing instructions and a control unit executing the instructions to detect an object of interest within an image of real space, detect an orientation and a position of the object, and generate a modified image. The generating comprises determining a region of the image of real space based on the detected orientation and position. The instructions may further include instructions to display a virtual image of the object in the region, change the virtual image based on a detected user input, the changed virtual image being maintained within the region, and display the modified image.

22 Claims, 19 Drawing Sheets

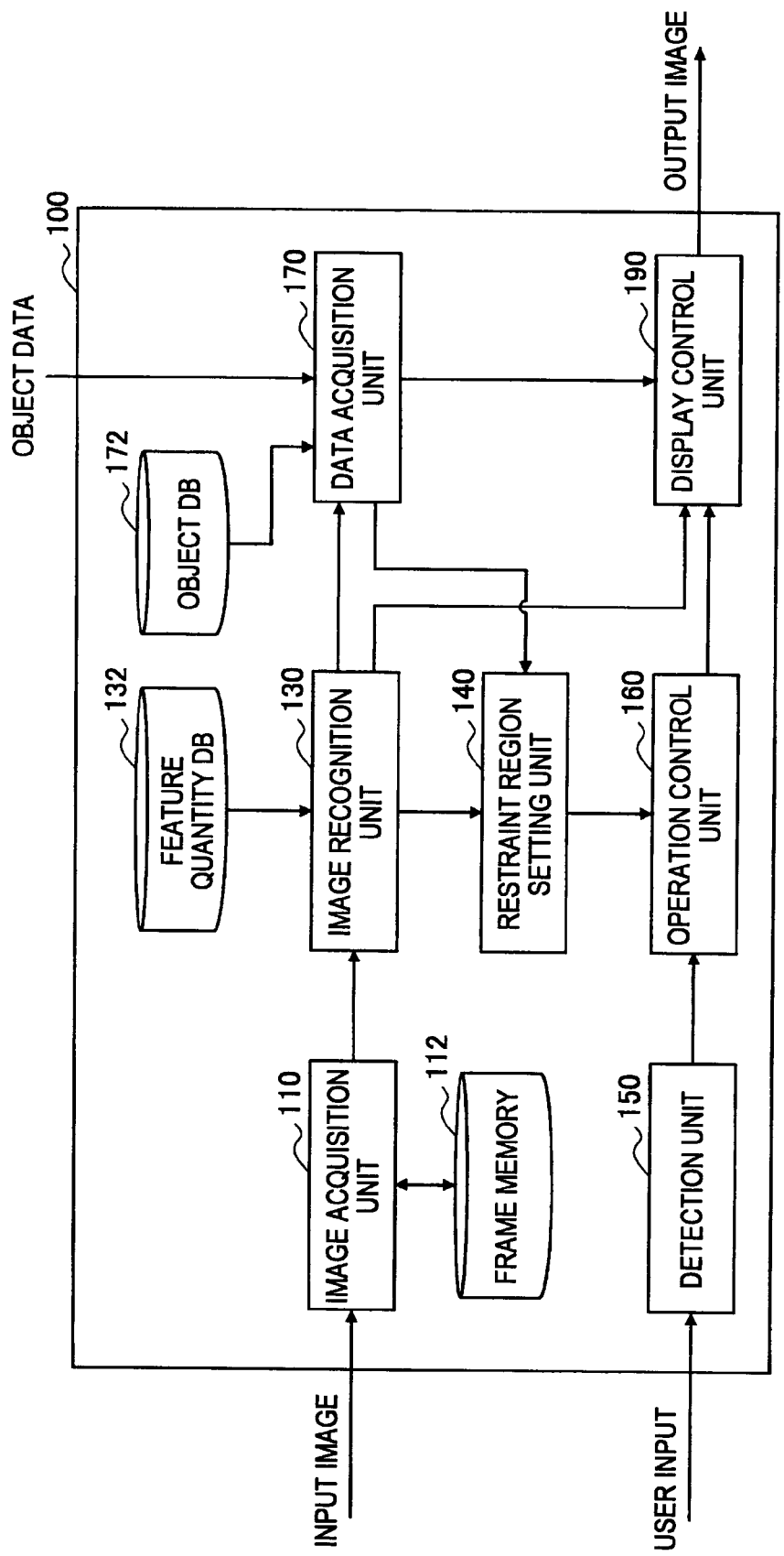

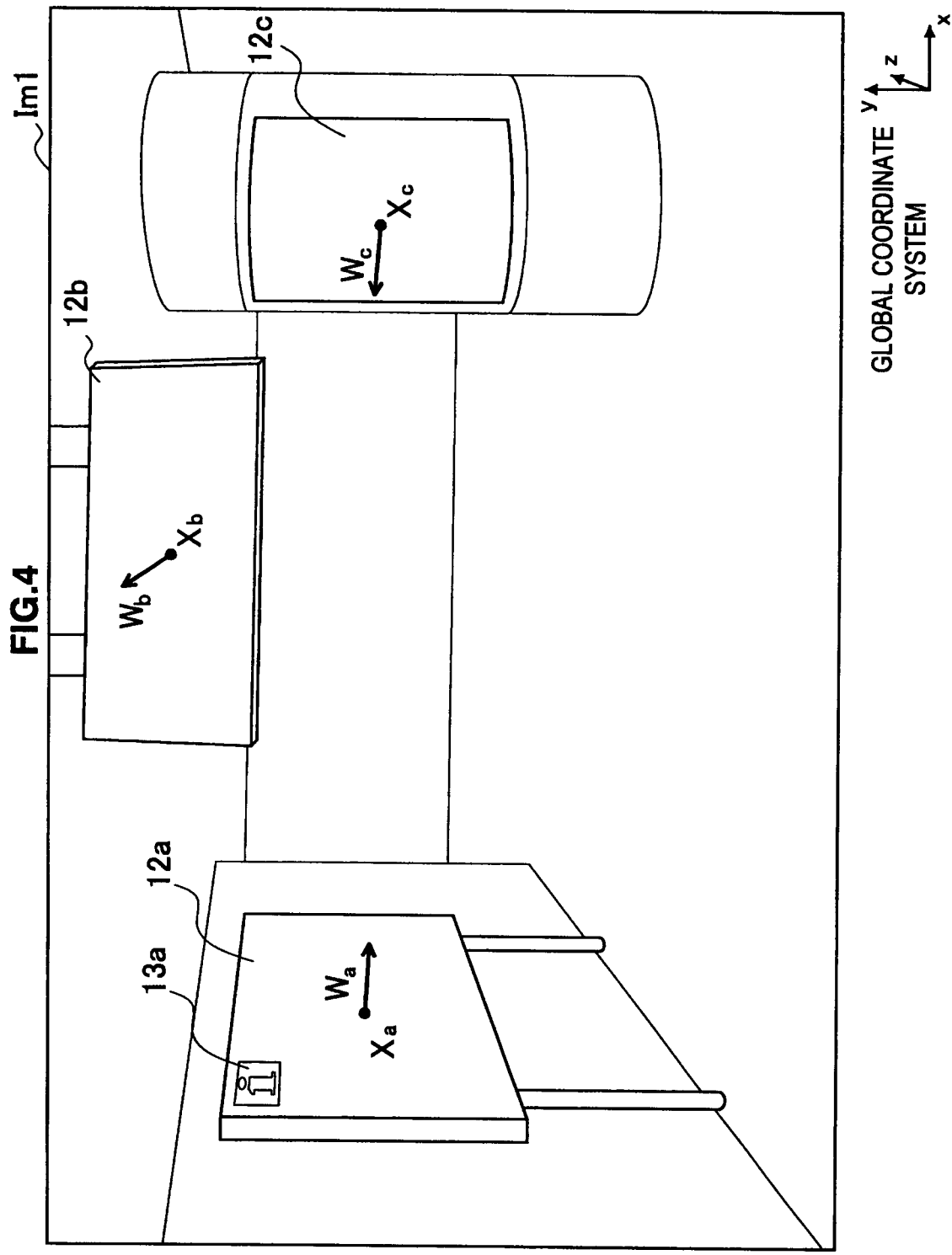

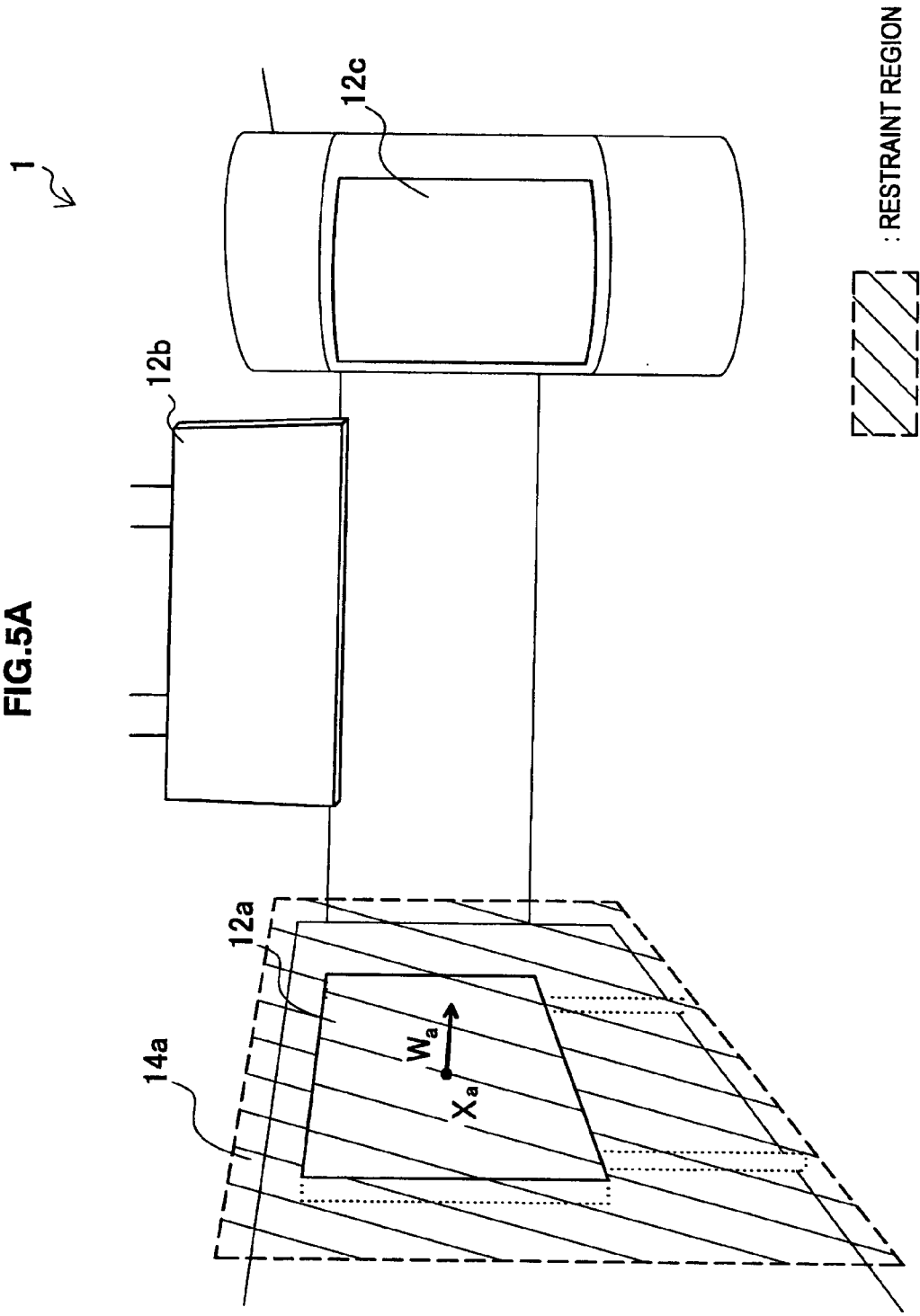

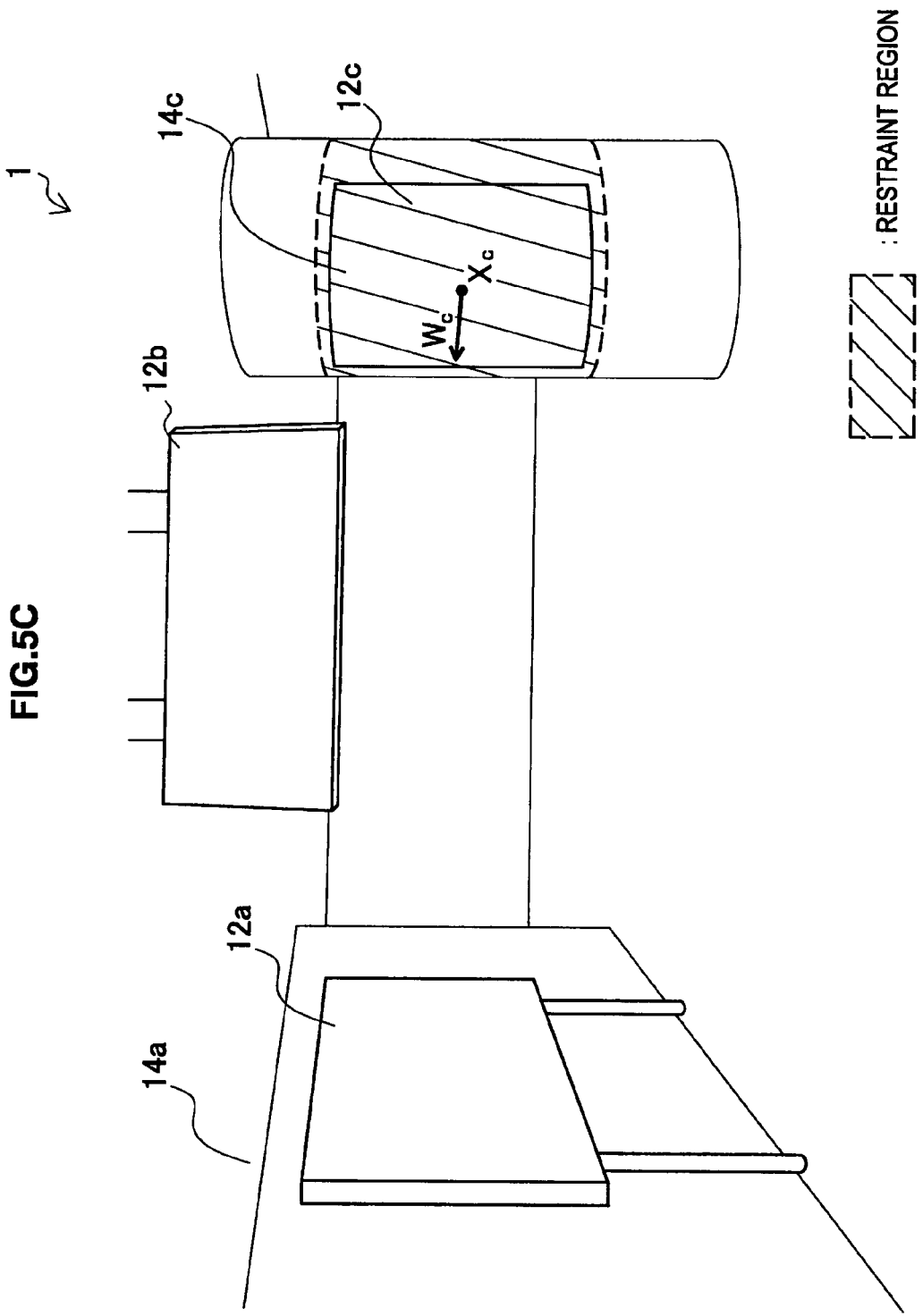

FIG.10
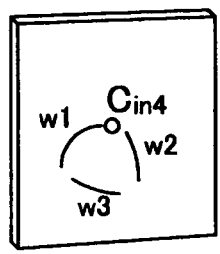
SENSOR COORDINATE SYSTEM
(GYRO SENSOR)
TILT TERMINAL
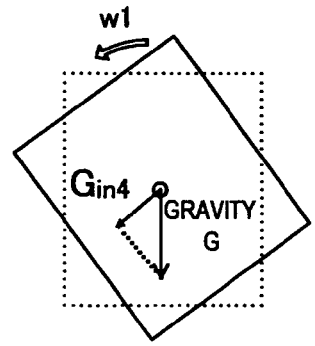
FIG.11
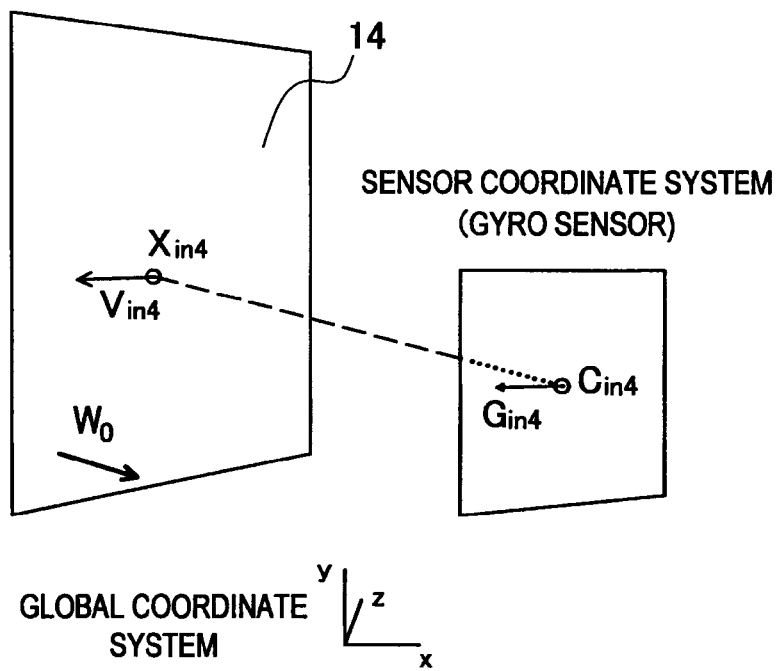
SENSOR COORDINATE SYSTEM
(GYRO SENSOR)
GLOBAL COORDINATE
SYSTEM

PINCH OUT AT MAP PORTION

MAP PORTION IS ENLARGED

TERMINAL IS TILTED TO RIGHT

VIRTUAL OBJECT IS SCROLLED TO FRONT RIGHT

TERMINAL DEVICE, OBJECT CONTROL METHOD, AND PROGRAM

RELATED APPLICATIONS

The present disclosure contains subject matter related to that disclosed in Japanese Priority Patent Application JP 2011-078075 filed in the Japan Patent Office on Mar. 31, 2011, the entire content of which is hereby incorporated by reference.

The present disclosure relates to a terminal device, an object control method, and a program.

BACKGROUND

In recent years, a technology called Augmented Reality (AR) for superimposing additional information onto the real world and presenting it to users is gaining attention. Information to be presented to the users in the AR technology is also called annotation, and may be visualized by using various types of virtual objects such as texts, icons, animations, and the like.

The AR technology may also be used in an application involving interaction with users. For example, with an application intended for provision of information, such as an advertisement or navigation, information meeting the needs of a user may be provided to the user by having the user operate an AR virtual object. As a document related to operation of an AR virtual object, there is JP 2010-238098A, for example.

However, with the technology described in JP 2010-238098A, motion of a virtual object operated by a user is determined irrespective of the situation of the real world. Accordingly, the sense of immersion of the user into a space, which is one advantage of the AR technology, may be diminished.

Accordingly, a mechanism is preferably provided that is capable of realizing operation of an AR virtual object without impairing substantially a sense of immersion of a user into an AR space.

According to the present disclosure, operation of an AR virtual object can be realized without impairing the sense of immersion of a user into an AR space.

SUMMARY

Aspects of the present invention include an apparatus comprising a memory storing instructions and a control unit. The control unit may execute the instructions to detect an object of interest within an image of real space, detect an orientation and a position of the object, and generate a modified image. The generating may comprise determining a region of the image of real space based on the detected orientation and position. The control unit may further execute the instructions to display a virtual image of the object in the region; change the virtual image based on a detected user input, the changed virtual image being maintained within the region; and display the modified image.

Aspects of the present invention include a method comprising detecting an object of interest within an image of real space, detecting an orientation and a position of the object, and generating a modified image. The generating may comprise determining a region of image of real space based on the detected orientation and position, displaying a virtual image of the object in the region, changing the virtual image based on a detected user input, the changed virtual image being maintained within the region; and displaying the modified image.

Aspects of the present invention include a tangibly embodied non-transitory computer-readable medium storing instructions which, when executed by a processor, perform a method comprising detecting an object of interest within an image of real space. The method may further comprise detecting an orientation and a position of the object, generating a modified image. The generating may comprise determining a region of the image of real space based on the detected orientation and position. The method may further comprise displaying a virtual image of the object in the region, changing the virtual image based on a detected user input, the changed virtual image being maintained within the region, and displaying the modified image.

BRIEF DESCRIPTION OF THE DRAWINGS

FIG. 3 is a block diagram showing an example of the configuration of the logical function of a terminal device according to an embodiment;

FIG. 4 is an explanatory diagram for describing an example of a result of image recognition;

FIG. 5A is an explanatory diagram showing a first example of a restraint region set in an embodiment;

FIG. 5C is an explanatory diagram showing a third example of a restraint region set in an embodiment;

FIG. 10 is a another explanatory diagram for describing operation of a virtual object via a motion sensor;

FIG. 11 is another explanatory diagram for describing operation of a virtual object via a motion sensor;

DETAILED DESCRIPTION

Figure 1:
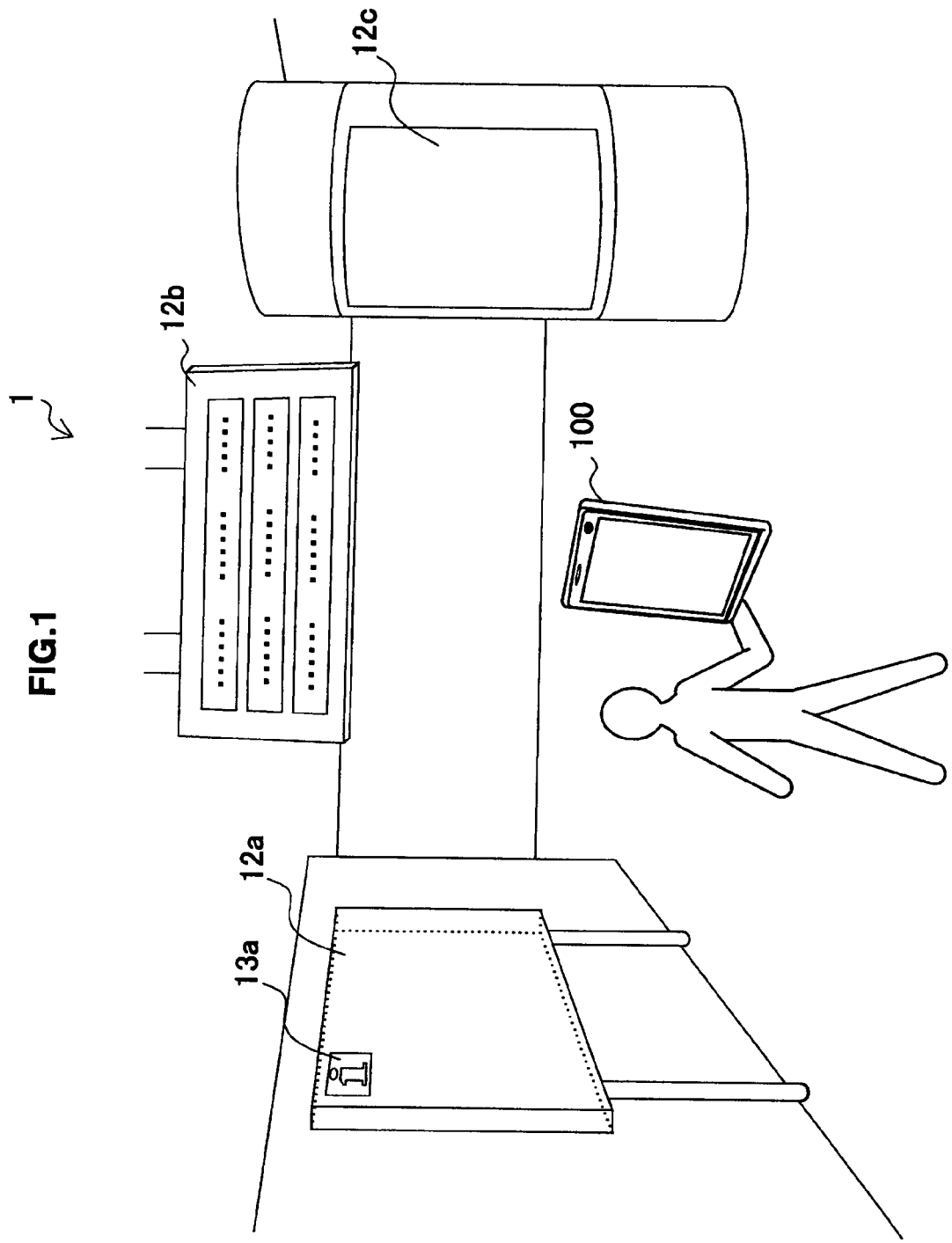
FIG. 1 is an explanatory diagram for describing an overview of a terminal device according to an embodiment.

Hereinafter, preferred embodiments of the present disclosure will be described in detail with reference to the appended drawings. Note that, in this specification and the appended drawings, structural elements that have substantially the same function and configuration are denoted with the same reference numerals, and repeated explanation of these structural elements is omitted.

1. Overview

FIG. 1 is an explanatory diagram for describing an overview of an embodiment of the technology disclosed in the present specification. Referring to FIG. 1, a terminal device 100 carried by a user in a real space 1 is shown.

The terminal device 100 is a device for providing an AR application involving an interaction with a user to the user. The terminal device 100 may be a smartphone, a PC (Personal Computer), a PDA (Personal Digital Assistant), a game terminal, or a portable music player, for example.

The real space 1 is an example of a space in which the AR application can be used. Real objects 12a, 12b, and 12c are present in the real space 1. The real object 12a is a board for announcements. A symbol mark 13a is attached to the real object 12a. The real object 12b is a bulletin board for information display. The real object 12c is an advertisement poster. The terminal device 100 acquires, as an input image, an image obtained by capturing such a real space 1 (e.g., a "real space image" or "image of real space"). The real space image may include, for example, a plurality of images of real space. When the real space image includes a plurality of images of real space obtained periodically, the real space image is said to be a "live image." It is to be understood that the term "real space image," as used herein, encompasses a single still image of real space, a plurality of still images of real space, and a live image of real space.

Then, the terminal device 100 may superimpose a virtual object for AR onto the input image, based on the recognition result of a real object shown in the input image. Information to be presented to a user via the virtual object may be any information, such as navigation information, advertisement information, shop information, news, weather reports, railway information, and the like. A user may operate a virtual object displayed on the screen of the terminal device 100, and interactively uses the AR application.

Although not explicitly shown in FIG. 1, a data server having a database regarding the virtual object or information to be presented to a user via the virtual object may be provided in the real space 1. The terminal device 100 may communicate with the data server by wireless connection, for example, and may download from the data server the latest data associated with the position of the terminal device 100. It is to be understood that any of the operations described herein (e.g., image processing, etc.) may be performed locally on a user device (e.g., terminal device 100) and/or may be performed remotely, such as by a server that is remote to the user device (e.g., a "remote server").

Figure 2:
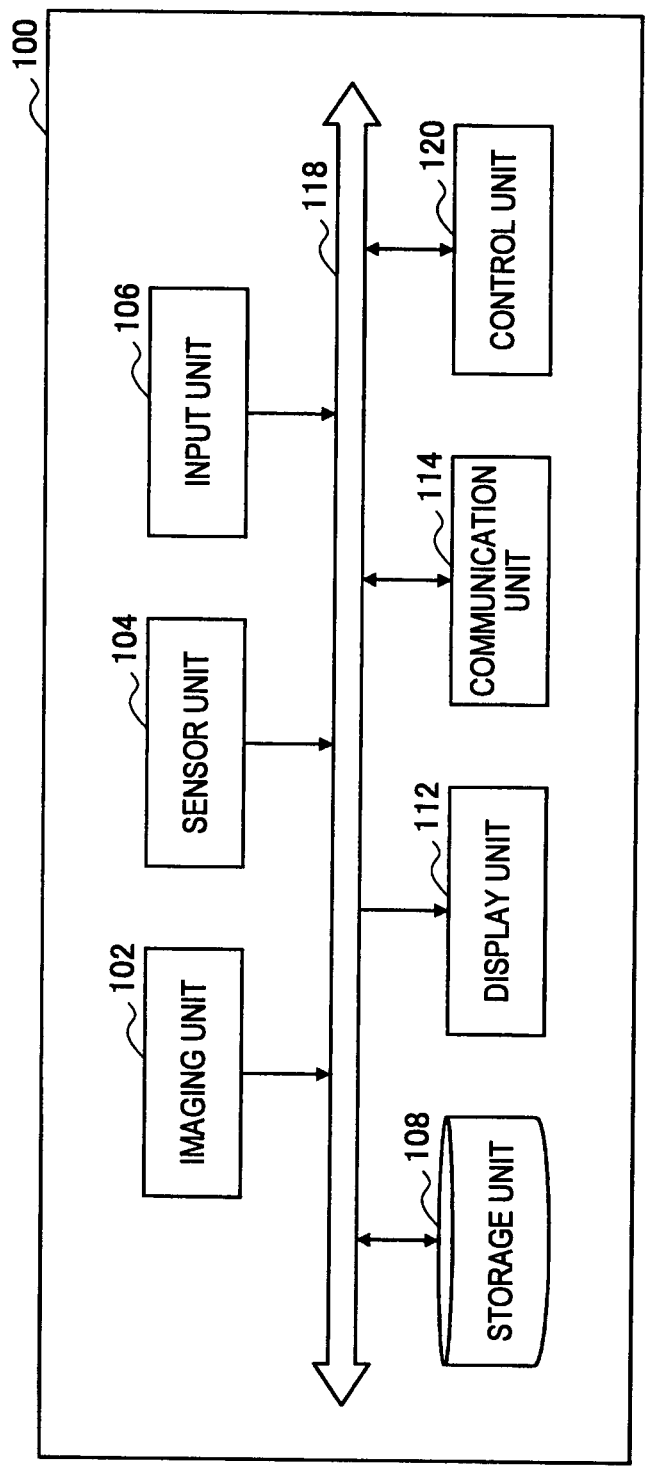
FIG. 2 is a block diagram showing an example of the hardware configuration of a terminal device according to an embodiment.

2. Example Configuration of Terminal Device According to an Embodiment 2-1. Hardware Configuration FIG. 2 is a block diagram showing an example of the hardware configuration of the terminal device 100 according to the present embodiment. Referring to FIG. 2, the terminal device 100 includes an imaging unit 102, a sensor unit 104, an input unit 106, a storage unit 108, a display unit 112, a communication unit 114, a bus 118, and a control unit 120.

Imaging Unit

The imaging unit 102 is a camera module which may capture an image. The imaging unit 102 captures the real space by using an image sensor such as a CCD (Charge Coupled Device) or a CMOS (Complementary Metal Oxide Semiconductor), and generates a captured image. The imaging unit 102 may also include both or one of an imaging circuit for video input and an imaging circuit for still image input.

Sensor Unit

The sensor unit 104 may include a group of sensors for supporting recognition of the position and the attitude of the terminal device 100, and detecting a part of user inputs to the terminal device 100. For example, the sensor unit 104 may include a GPS sensor that receives a GPS (Global Positioning System) signal and measures the latitude, the longitude and the altitude of the terminal device 100. Also, the sensor unit 104 may include a positioning sensor that measures the position of the terminal device 100 based on the intensity of a radio signal received from a wireless access point. Furthermore, the sensor unit 104 may include a motion sensor, such as an acceleration sensor that measures the three-axis acceleration of the terminal device 100 or a gyro sensor that measures the tilt angle.

Input Unit

The input unit 106 may include an input device used by a user to operate the terminal device 100 or to input information to the terminal device 100. Typically, the input unit 106 includes a touch sensor that detects a touch of a user on the screen of the display unit 112. Alternatively (or in addition thereto), the input unit 106 may include a pointing device such as a mouse or a touchpad, a gesture recognition module that recognizes the gesture of a user shown in the image, or a line-of-sight detection module that detects the direction of the line of sight of a user wearing a head-mounted display (HMD). Furthermore, the input unit 106 may include other types of input devices such as a keyboard, a key pad, a button, a switch, and the like.

Storage Unit

The storage unit 108 may be configured from a storage medium such as a semiconductor memory, a hard disk, or the like, and stores program and data to be used for processing by the terminal device 100. The data to be stored in the storage unit 108 may include, for example, image data generated by the imaging unit 102 and sensor data generated by the sensor unit 104. The data to be stored in the storage unit 108 may also include, for example, feature quantity data used at the time of image recognition by the terminal device 100, object data defining a virtual object, and the like.

Display Unit

The display unit 112 may include a display module that is configured from an LCD (Liquid Crystal Display), an OLED (Organic Light-Emitting Diode), a CRT (Cathode Ray Tube), or the like. The display unit 112 may display on a screen an image captured by the imaging unit 102 or an image of the AR application realized by the control unit 120, for example. The display unit 112 may be the screen of the terminal device 100 held by a user, or a see-through or non-see-through HMD worn by the user.

Communication Unit

The communication unit 114 may include a communication interface that intermediates communication by the terminal device 100 with another device (for example, the data server described above). The communication unit 114 may support an arbitrary wireless communication protocol or wired communication protocol, and establishes a communication connection to another device.

Bus

The bus 118 may connect with each other the imaging unit 102, the sensor unit 104, the input unit 106, the storage unit 108, the display unit 112, the communication unit 114, and the control unit 120.

Control Unit

The control unit 120 may include a processor such as a CPU (Central Processing Unit), a DSP (Digital Signal Processor), or the like. The control unit 120 executes a program stored in the storage unit 108 or in another storage medium, and causes various functions of the terminal device 100 described later to operate.

2-2. Functional Configuration

FIG. 3 is a block diagram showing an example of the configuration of the logical function realized by the storage unit 108 and the control unit 120 of the terminal device 100 shown in FIG. 2. Referring to FIG. 3, the terminal device 100 may include an image acquisition unit 110, a frame memory 112, an image recognition unit 130, a feature quantity database (DB) 132, a restraint region setting unit 140, a detection unit 150, an operation control unit 160, a data acquisition unit 170, an object DB 172, and a display control unit 190.

(1) Image Acquisition Unit

The image acquisition unit 110 may acquire an image showing the real space as an input image. In the present embodiment, the image acquisition unit 110 supports two input modes, a real-time mode and a snapshot mode. In the real-time mode, the image acquisition unit 110 sequentially acquires as input images the latest frames of the video input from the imaging unit 102. In the snapshot mode, the image acquisition unit 110 first causes, at the time of beginning of the snapshot mode, the frame memory 112 to store a snapshot captured by the imaging unit 102. In the case the imaging unit 102 includes the imaging circuit for video input and the imaging circuit for still image input, the snapshot may be an image captured by the imaging circuit for still image input. Then, the image acquisition unit 110 successively acquires snapshots stored in the frame memory 112 as input images. Switching between the real-time mode and the snapshot mode may be performed by a specific user input via the input unit 106. The image acquisition unit 110 outputs the input image acquired in this manner to the image recognition unit 130.

(2) Image Recognition Unit

The image recognition unit 130 may recognize which real object is shown in the input image input from the image acquisition unit 110. The image recognition unit 130 also recognizes the position and the attitude, in the real space, of the real object shown in the input image. More particularly, the image recognition unit 130 may extract a feature quantity of the input image, for example. Then, the image recognition unit 130 checks the extracted feature quantity against the feature quantities of various known real object images that are stored in the feature quantity DB 132 in advance, and thereby identifies the real object shown in the input image and recognizes the position and the attitude of the real object. A feature quantity extraction algorithm used by the image recognition unit 130 may be, for example, Random Ferns method described in "Fast Keypoint Recognition using Random Ferns" (Mustafa Oezuysal, IEEE Transactions on Pattern Analysis and Machine Intelligence, Vol. 32, Nr. 3, pp. 448-461, March 2010), or SURF method described in "SURF: Speeded Up Robust Features" (H. Bay, A. Ess, T. Tuytelaars and L. V. Gool, Computer Vision and Image Understanding (CVIU), Vol. 110, No. 3, pp. 346-359, 2008). Alternatively, the image recognition unit 130 may identify the real object shown in the input image by using a known diagram or symbol (for example, a mark that is uniformly attached to a board for announcements, such as the symbol mark 13a of the real object 12a shown in FIG. 1), an artificial mark (for example, a bar code or a QR code), a natural mark or the like attached to the real object, and may recognize, based on the size and shape of the real object in the input image, its position and attitude.

FIG. 4 is an explanatory diagram for describing an example of the result of image recognition by the image recognition unit 130. Referring to FIG. 4, an input image Im1, which is an example, to be input to the image recognition unit 130 is shown. The position $X_a$ and the attitude $W_a$ of the real object 12a, the position $X_b$ and the attitude $W_b$ of the real object 12b, the position $X_c$ and the attitude $W_c$ of the real object 12c shown in the input image Im1 are recognized as a result of image recognition by the image recognition unit 130. The position X of each real object may be given as the position of the reference point of each real object by a three-dimensional global coordinate system (x, y, z). The global coordinate system may be a coordinate system indicating relative positional coordinates having the position of the terminal device 100 as the origin. Alternatively, the global coordinate system may be a coordinate system that is fixedly defined in the real space. The attitude W of each real object may be given as a rotation matrix or a quaternion indicating the rotation of each real object relative to the global coordinate system. Additionally, in the present specification, the position X and the attitude W of each real object will be described as independent variables, for the sake of simplicity of explanation. However, the position X and the attitude W of each real object may also be integrally expressed by one homogeneous transformation matrix with four rows and four columns indicating transformation between the global coordinate system and the model coordinate system of each real object. In this case, the position X and the attitude W of each real object may be extracted as necessary from the one homogeneous transformation matrix and be used. The image recognition unit 130 outputs an identifier, the position, and the attitude of each real object shown in the input image, which has been recognized in the above manner, to the restraint region setting unit 140, the data acquisition unit 170, and the display control unit 190.

(3) Restraint Region Setting Unit

The restraint region setting unit 140 sets, in the real space shown in the input image, a restraint region that restrains the motion of a virtual object which is operated according to a user input, based on the attitude of the real object recognized by the image recognition unit 130. The restraint region is a region having at most two dimensions that is expressed by lines or a plane. Typically, the restraint region setting unit 140 may set the restraint region for each real object that is associated with an operable virtual object. The restraint region may be set along the surface of a real object that is recognized within the input image, for example. In this case, if the virtual object may be a substantially planar object, the virtual object is arranged on the surface of an associated real object and may be moved, scaled, or scrolled along the surface. The restraint region may also be set at a position having a predetermined offset to the real object recognized within the input image, for example. Additionally, the substantially planar object is not limited to having a completely planar surface, and may include a planar object having some bumps, irregular thickness, or the like.

FIG. 5A is an explanatory diagram showing a first example of the restraint region set in the real space 1 by the restraint region setting unit 140 in the present embodiment. Referring to FIG. 5A, a restraint region 14a, which is an example, that is set in association with the real object 12a is shown. The restraint region 14a is a planar region set along the surface of the real object 12a. The motion of a virtual object that is associated with the real object 12a is restrained by such restraint region 14a (for example, it does not move out of the restraint region 14a).

Figure 5B:
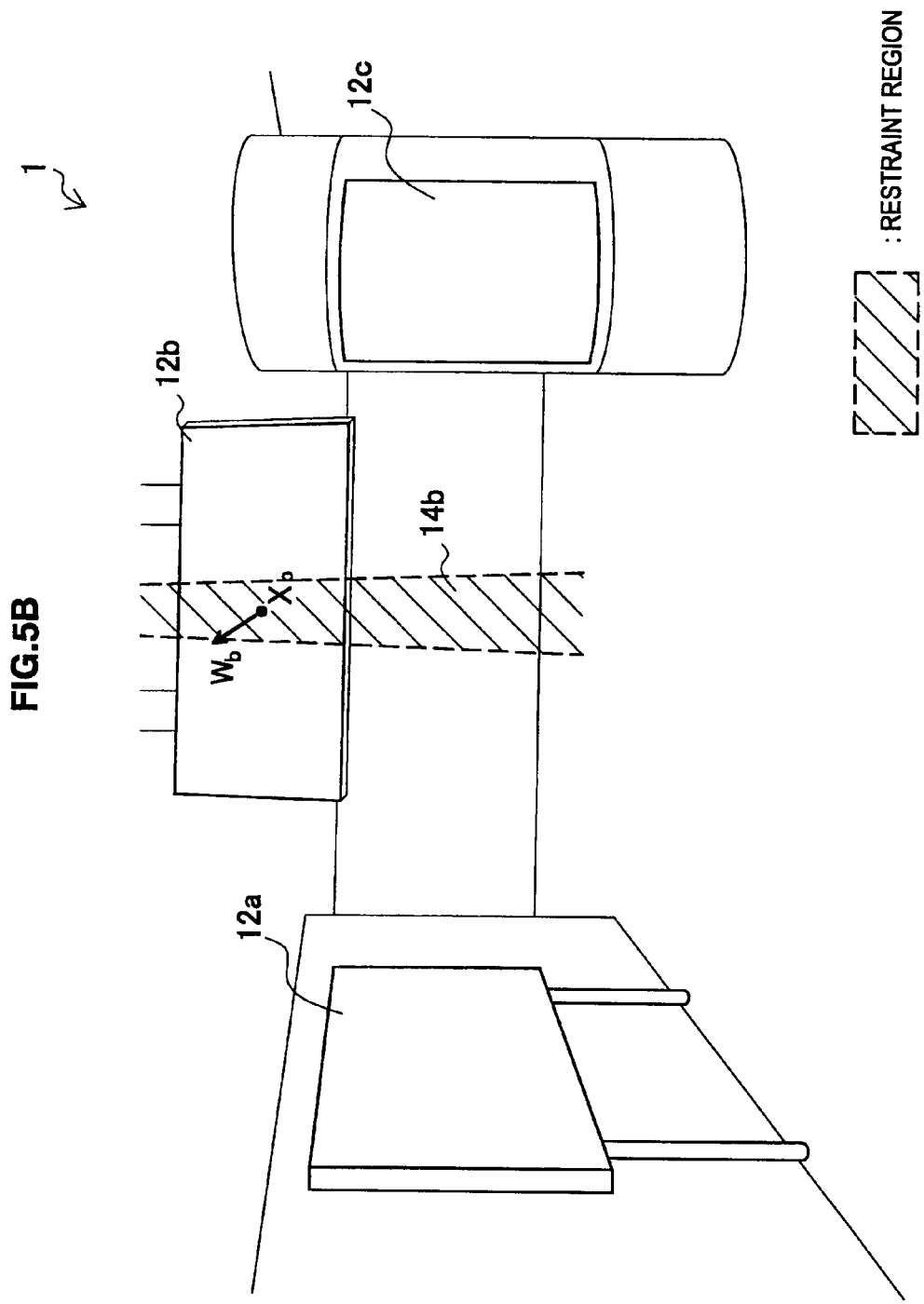
FIG. 5B is an explanatory diagram showing a second example of a restraint region set in an embodiment.

FIG. 5B is an explanatory diagram showing a second example of the restraint region set in the real space 1 by the restraint region setting unit 140 in the present embodiment. Referring to FIG. 5B, a restraint region 14b, which is an example, that is set in association with the real object 12b is shown. The restraint region 14b is a linear region that runs through the middle of the real object 12b and that is set along the vertical direction of the real object 12b. The motion of a virtual object that is associated with the real object 12b is restrained by such restraint region 14b (for example, it can only be scrolled in the vertical direction along the restraint region 14b).

FIG. 5C is an explanatory diagram showing a third example of the restraint region set in the real space 1 by the restraint region setting unit 140 in the present embodiment. Referring to FIG. 5C, a restraint region 14c, which is an example, that is set in association with the real object 12c is shown. The restraint region 14c is a curved region set along the surface of the real object 12c. As described, the shape of the restraint region is not limited to planar or straight, and may be a curved surface, a polygonal shape, a curved line shape, a zigzag line shape, or the like.

(4) Detection Unit

The detection unit 150 detects a user input, and outputs user input information to the operation control unit 160. The user input to be detected by the detection unit 150 may include, for example, various touch inputs to the touch sensor of the input unit 106 shown in FIG. 2 (for example, a touch, a tap, a double-tap, a drag, a flick, a pinch in, a pinch out, and the like). Furthermore, the user input to be detected by the detection unit 150 may also include the motion of the terminal device 100 (for example, tilting, swinging, or the like) measured by the sensor group of the sensor unit 104 shown in FIG. 2, for example.

(5) Operation Control Unit

The operation control unit 160 may control operation of a user on the virtual object displayed on the screen of the terminal device 100. More particularly, when a user input is detected by the detection unit 150, the operation control unit 160 first identifies the virtual object that is the operation target. Next, the operation control unit 160 determines, according to the user input, the motion of the identified virtual object within the restraint region that is associated with the real object corresponding to the virtual object. Then, the operation control unit 160 notifies the display control unit 190 of the motion of the virtual object which has been determined, and causes the arranged location, the size, the scroll position or the like of the virtual object on the screen to be changed by the display control unit 190. The motion of the virtual object, such as movement, scaling, scrolling or the like, is thereby visualized.

(5-1) User Input by Touch Sensor

Figure 6:
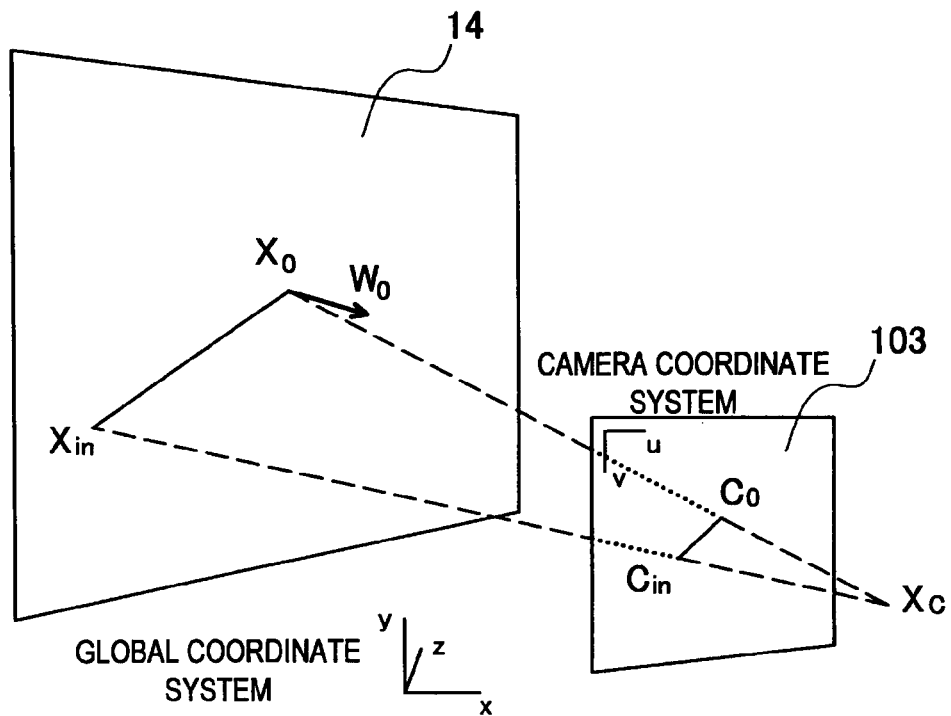
FIG. 6 is an explanatory diagram for describing operation of a virtual object via a touch sensor.
Figure 7:
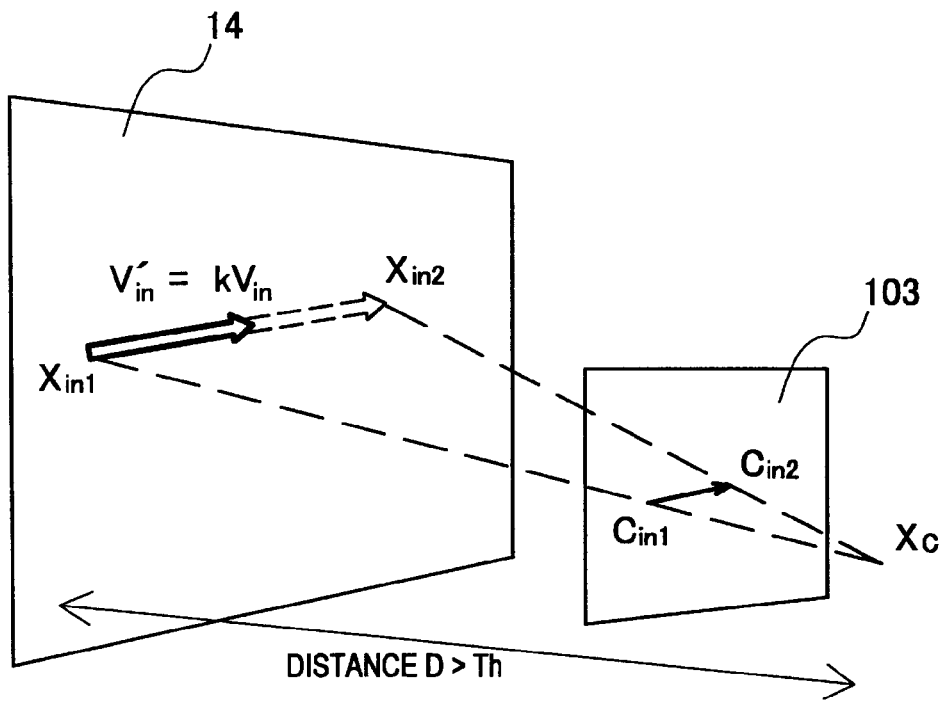
FIG. 7 is another explanatory diagram for describing operation of a virtual object via a touch sensor.

FIGS. 6 and 7 are explanatory diagrams for describing operation, controlled by the operation control unit 160, of the virtual object via the touch sensor. Referring to FIG. 6, a planar restraint region 14 set in the real space and an image plane 103 of an imaging device are shown. The position $X_0$ and the attitude $W_0$ of the restraint region 14 may be the same as the position and the attitude of the real object that is associated with the restraint region 14, or may have a predetermined offset to the position and the attitude of the real object. An input position $C_{in}$ of a user input to the touch sensor is given by a camera coordinate system (u, v, 1) on the image plane 103. The operation control unit 160 may calculate a position $X_{in}$ within the restraint region 14 corresponding to the input position $C_{in}$, according to the following pinhole mode, for example.

$$X_{in} = X_0 + \lambda W_0 A^{-1}(C_{in} - C_0) \quad (1)$$

In Formula (1), $C_0$ is a position on the image plane corresponding to the reference position $X_0$ of the restraint region 14, matrix A is a camera internal parameter, and λ is a parameter for normalization. The camera internal parameter A is given in advance, as by the following formula, according to the property of the imaging unit 102.

$$A = \begin{pmatrix} -f \cdot k_u & f \cdot k_u \cdot \cot\theta & u_o \\ 0 & -\dfrac{f \cdot k_v}{\sin\theta} & v_o \\ 0 & 0 & 1 \end{pmatrix} \quad (2)$$

Here, f is the focal length, θ is the orthogonality of an image axis (ideal value is 90 degrees), $k_u$ is the scale of the vertical axis of the image plane (rate of change of scale from the coordinate system of the real space to the camera coordinate system), K, is the scale of the horizontal axis of the image plane, and ($u_o$, $v_o$) is the centre position of the image plane.

For example, for a user input specifying a vector such as a drag, the operation control unit 160 may determine a motion vector $V_{in}$ of the virtual object within the restraint region 14, as by the following formula, based on two input positions, $C_{in1}$ and $C_{in2}$, corresponding to the start point and end point of the vector.

$$V_{in} = X_{in2} - X_{in1} = \lambda W_0 A^{-1}(C_{in2} - C_{in1}) \quad (3)$$

In Formula (3), $X_{n1}$ and $X_{in2}$ are positions in the restraint region corresponding to the input positions $C_{in1}$ and $C_{in2}$, respectively. Additionally, even if the restraint region has a shape of a curved surface or a polygonal shape, the operation control unit 160 may likewise determine the position in the restraint region corresponding to each input position, by projecting the input positions of the user input on the restraint region. Also, if the restraint region is linearly shaped, the operation control unit 160 may project the input position of the user input on this one-dimensional restraint region.

At the time of determining the motion vector $V_{in}$ by projecting the input positions of the user input on the restraint region as by the above Formula (3), if the distance between the restraint region 14 and the terminal device 100 is large, the magnitude of the motion vector $V_{in}$ may become excessively large relative to the user input. Thus, the operation control unit 160 may change the proportion of the magnitude of the motion vector $V_{in}$ to the magnitude of the input vector on the screen, according to the distance between the terminal device 100 and the restraint region 14. This enables the user to make subtle adjustments on the motion of the virtual object with more ease. The magnitude of the input vector and the magnitude of the motion vector $V_{in}$ correspond, for example, to the amount of dragging on the screen and the amount of motion of the virtual object, respectively.

For example, in the case a drag from the input position $C_{in1}$ to $C_{in2}$ is detected in the example of FIG. 7, the operation control unit 160 calculates the positions $X_{in1}$ and $X_{in2}$ within the restraint region 14 corresponding respectively to the input positions $C_{in1}$ and $C_{in2}$. Here, a distance D between the terminal device 100 and the restraint region 14 exceeds a predetermined threshold Th. Accordingly, the operation control unit 160 calculates a corrected motion vector $V''_{in}$ of the virtual object by multiplying the motion vector $V_{in}$ from the position $X_{in1}$ to $X_{in2}$ by a coefficient k (k<1). The coefficient k may be a coefficient that decreases as the distance between the terminal device 100 and the restraint region 14 increases, for example.

(5-2) User Input via Motion Sensor

FIGS. 8 to 11 are explanatory diagrams for describing operation, controlled by the operation control unit 160, of the virtual object via the motion sensor.

Figure 8:
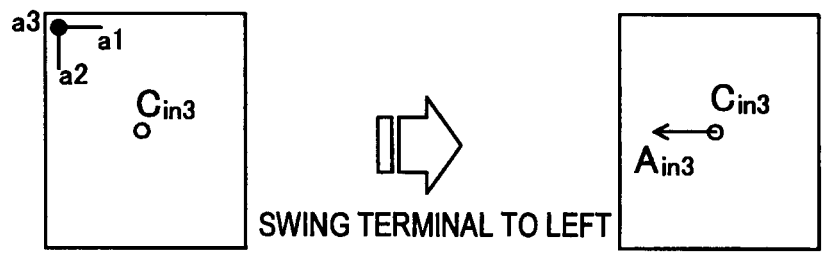
FIG. 8 is a first explanatory diagram for describing operation of a virtual object via a motion sensor.
Figure 9:
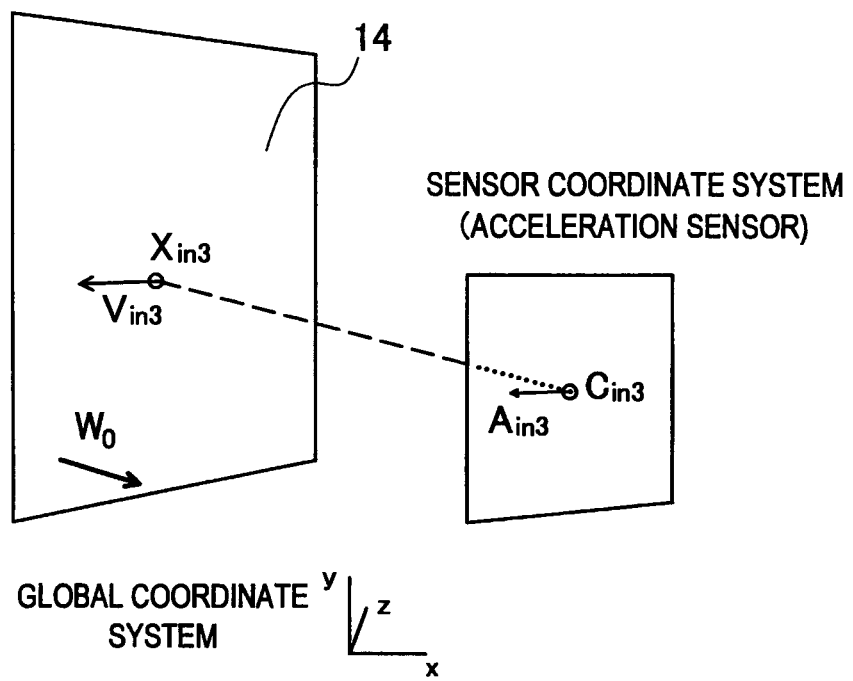
FIG. 9 is a second explanatory diagram for describing operation of a virtual object via a motion sensor.

Referring to FIG. 8, a sensor coordinate system (a1, a2, a3) of the acceleration sensor of the terminal device 100 is shown. For example, the a1 axis is an axis along the horizontal direction of the screen of the terminal device 100, the a2 axis is an axis along the vertical direction of the screen, and the a3 axis is an axis along the depth direction of the screen. Here, it is assumed, for example, that the user swings the terminal device 100 to the left along the horizontal direction of the screen of the terminal device 100 while touching the input position $C_{in3}$. Then, an acceleration vector $A_{in3}$ having a large value for the a1 axis component occurs in sensor data from the acceleration sensor. When such sensor data is input from the detection unit 150, the operation control unit 160 calculates a motion vector within the restraint region corresponding to the acceleration vector $A_{in3}$. In the example of FIG. 9, a case is shown where a motion vector $V_{in3}$ corresponding to the acceleration vector $A_{in3}$ is calculated by projecting the acceleration vector $A_{in3}$ on the plane of the restraint region 14.

Referring to FIG. 10, a sensor coordinate system (w1, w2, w3) for a tilt angle measured by the gyro sensor of the terminal device 100 is shown. Here, it is assumed, for example, that the user tilts the terminal device 100 around an axis vertical to the screen of the terminal device 100 (in the w1 direction) while touching the input position $C_{in4}$. Then, the value of the w1 axis component increases in the sensor data from the gyro sensor. When such sensor data is input from the detection unit 150, the operation control unit 160 perceives that a horizontal component $G_{in4}$ of gravity G is added to the terminal device 100. Then, the operation control unit 160 calculates a motion vector within the restraint region corresponding to the horizontal component $G_{in4}$ of gravity G. In the example of FIG. 11, a case is shown where a motion vector $V_{in4}$ corresponding to the horizontal component $G_{in4}$ is calculated by projecting the horizontal component $G_{in4}$ on the plane of the restraint region 14.

Additionally, a user input via the touch sensor or the motion sensor has been mainly described here. However, the operation control unit 160 may also control operation of the virtual object according to a user input of a type different from the above examples, such as a predetermined gesture of the user, for example. The gesture of the user may be recognized from the image captured by an imaging device (different from the device capturing the input image) that is pointed toward the user. Alternatively, the gesture of the user may be recognized from the image captured by an imaging device pointed toward the direction of the line of sight of the user, as in the case of using the HMD, for example.

(5-3) Specifying of Operation Target

The operation control unit 160 may determine the virtual object to be the operation target according to the input position of a user input. For example, in the case the virtual object to be the operation target is to be selected by the start of dragging or touch on the touch sensor, a virtual object whose determination region exists on the projection line connecting the input position and the focus position of the camera is determined to be the operation target. In the present specification, the determination region refers to a region on the screen that is associated with a virtual object that causes, by being specified by the user, the virtual object to be determined as the target object. In the case there are determination regions of a plurality of virtual objects on the projection line, the virtual object that is positioned nearest to the terminal device 100 may be made the operation target. The determination region of the virtual object does not necessarily have to coincide with the region in which the virtual object is displayed. Also, the operation control unit 160 may also specify, regardless of the determination region, the largest displayed virtual object on the screen of the terminal 100, the virtual object positioned nearest to the terminal device 100, a virtual object that is aligned in parallel with the screen of the terminal device 100, or the like, as the operation target.

(5-4) Example of Motion of Virtual Object

In the present embodiment, the motion of the virtual object may be determined according to the type of the user input, and the position or the motion vector within the restraint region determined according to the user input.

For example, it is assumed that the virtual object is a substantially planar object that displays specific information. The specific information may be navigation information, advertisement information, shop information, news, weather reports, railway information, or the like, for example. In this case, if the substantially planar virtual object is dragged by the user, for example, the operation control unit 160 may scroll the displayed information within a three-dimensional space, along the direction of the motion vector within the restraint region determined according to the drag direction. The amount of scroll may, for example, correspond to the magnitude of the motion vector. Also, if the substantially planar virtual object is pinched in or pinched out by the user, the operation control unit 160 may scale (e.g. reduce or enlarge) the displayed information according to the magnitude of the motion vector within the restraint region corresponding to the pinch-in or pinch-out. Furthermore, if any of positions on the screen is tapped in a state where the substantially planar virtual object is already specified, the operation control unit 160 may move the virtual object to the position within the restraint region corresponding to the tapped position. Also, if an acceleration is added to the terminal device 100 in a state where the substantially planar virtual object is already specified, the operation control unit 160 may scroll the displayed information within a three-dimensional space along the direction of the motion vector within the restraint region corresponding to the acceleration vector that has occurred. Examples of such motion of the virtual object will be further described later with reference to the drawings.

Additionally, the virtual object is not restricted to the above examples, and it may be a three-dimensional object (an announcement board for navigation, a polygon of merchandise being advertised, or the like), for example. Also in this case, the location, the size or the like of the virtual object may be determined according to the type of the user input, and the position or the motion vector within the restraint region determined according to the user input.

(6) Data Acquisition Unit

The data acquisition unit 170 may acquire data regarding the virtual object that is superimposed onto the input image by the display control unit 190. The data to be acquired by the data acquisition unit 170 includes object data defining the virtual object. The object data may define, for example, the type of the virtual object, the identifier of the associated real object, the relative display position from the real object, the contents of information presented to the user, and the like. The contents of information presented to the user may be in a text format or an image format. The data acquisition unit 170 may also acquire object data that is stored in advance in the object DB 172. Alternatively, the data acquisition unit 170 may acquire the latest object data from a data server installed in the real space via the communication unit 114. The object data to be provided by the data server may be data different depending on the position of the terminal device 100 measured by the sensor unit 104, for example. The data acquisition unit 170 outputs the object data as described above to the display control unit 190.

(7) Display Control Unit

The display control unit 190 generates an output image by superimposing the virtual object onto the input image. More particularly, the object data of the virtual object that is associated with a real object that is recognized as being shown in the input image by the image recognition unit 130 is input to the display control unit 190 from the data acquisition unit 170, for example. The display control unit 190 generates an object image of the virtual object based on the object data as described. The object image generated by the display control unit 190 is typically an image obtained by projecting a virtual object that is virtually arranged in a three-dimensional real space on the image plane of the terminal device 100 (according to the pinhole method described above, for example). The position and the attitude of the virtual object within the real space may be determined according to the position and the attitude of the associated real object and the definition by the object data. Then, the display control unit 190 displays the image of the AR application by outputting the generated output image to the display unit 112.

Furthermore, the display control unit 190 changes the state of the virtual object (the position, the attitude, the size, the scroll position, or the like) according to the motion of the virtual object determined by the operation control unit 160. For example, in the real-time mode, the display control unit 190 superimposes the object image of the virtual object whose state changes moment by moment according to the user input onto each of the input images sequentially acquired by the image acquisition unit 110. The motion of the virtual object can thereby be expressed in the output image that is updated in real time. Also, in the snapshot mode, the display control unit 190 replicates the snapshot of the input image acquired from the frame memory 112 by the image acquisition unit 110 for a plurality of frames, and superimposes the object image expressing the motion of the virtual object on each of the replicated snapshots. The motion of the virtual object is thereby expressed on the snapshot of a still image.

Also, the display control unit 190 may further superimpose onto the input image an auxiliary object indicating the movable direction of the virtual object within the restraint region. Furthermore, the display control unit 190 may further superimpose onto the input image an auxiliary object indicating the determination region of each virtual object. An example of the auxiliary object to be displayed by the display control unit 190 will be described later with reference to a drawing.

3. Flow of Process

Figure 12:
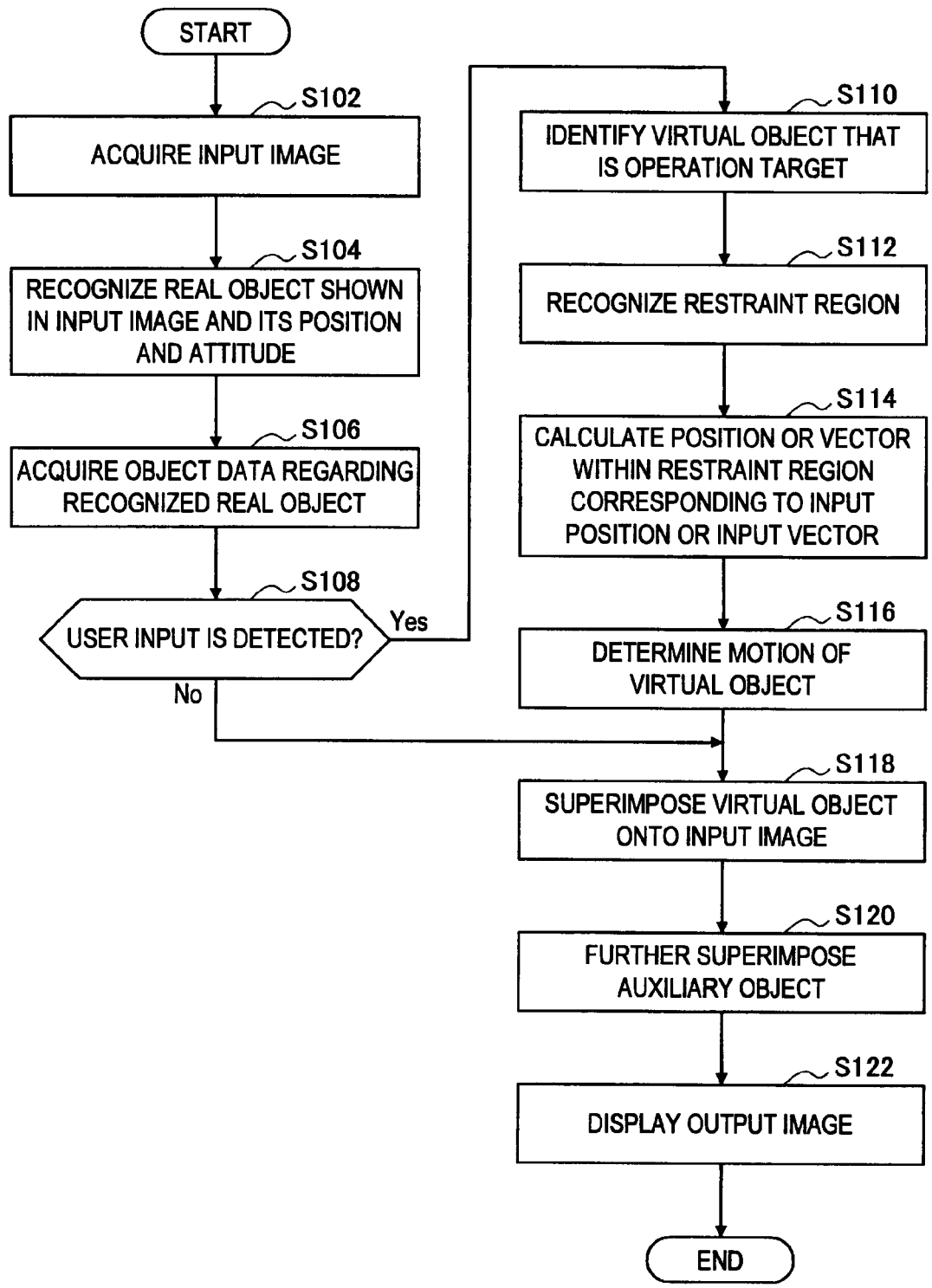
FIG. 12 is a flow chart showing an example of the flow of an object control process according to an embodiment.

FIG. 12 is a flow chart showing an example of the flow of an object control process by the terminal device 100 according to the present embodiment.

Referring to FIG. 12, first, the image acquisition unit 110 acquires an input image that has been captured by the imaging unit 102 or that is stored in the frame memory 112 (step S102). Next, the image recognition unit 130 may recognize the real object(s) shown in the acquired input image, and the position and the attitude of the real object(s) (step S104). Next, the data acquisition unit 170 acquires object data regarding the recognized real object(s) from the object DB 172 or an external data server (step S106).

Next, the operation control unit 160 determines whether a user input for operating a virtual object has been detected by the detection unit 150 or not (step S108). Here, in the case a user input has been detected by the detection unit 150, the process proceeds to step S110. On the other hand, in the case a user input has not been detected, the process proceeds to step S118.

In the case a user input has been detected, the operation control unit 160 identifies the virtual object that is the operation target, based on a reference such as the input position of the user input, the size of the virtual object on the screen, the distance between the virtual object and the terminal device 100, or the like (step S110). Next, the operation control unit 160 recognizes a restraint region set by the restraint region setting unit 140 in association with the virtual object which has been identified (step S112). Next, the operation control unit 160 calculates the three-dimensional position or the vector within the restraint region corresponding to the input position or the input vector of the user input (step S114). Then, the operation control unit 160 determines the motion of the virtual object that is the operation target, based on the position or the vector within the restraint region which has been calculated and the type of the user input (step S116).

In step S118, the display control unit 190 generates object image(s) of the virtual object(s) by projecting the virtual object(s) which are virtually arranged within the real space onto the image plane, and superimposes the generated object image(s) onto the input image (step S118). The state of the virtual object here is, in the case the virtual object is not operated, an initial state (the initial state may be defined by the object data). On the other hand, in the case the virtual object is operated, the state of the virtual object is the state that has been changed according to the motion determined by the operation control unit 160. Next, the display control unit 190 further superimposes onto the input image an auxiliary object that indicates the movable direction of each virtual object within the restraint region (step S120). Then, an output image onto which the virtual object(s) and the auxiliary object(s) have been superimposed is displayed on the screen (step S122).

In the real-time mode, the object control process shown in FIG. 12 may be repeated for each frame captured by the imaging unit 102. Also, in the snapshot mode, the object control process may be performed using a snapshot acquired from the frame memory 112 by the image acquisition unit 110 as the input image. In the snapshot mode, the motion of the virtual object may be expressed as an animation by repeatedly performing the process through steps S118 to S122 for one (or one-stroke) user input.

Figure 13:
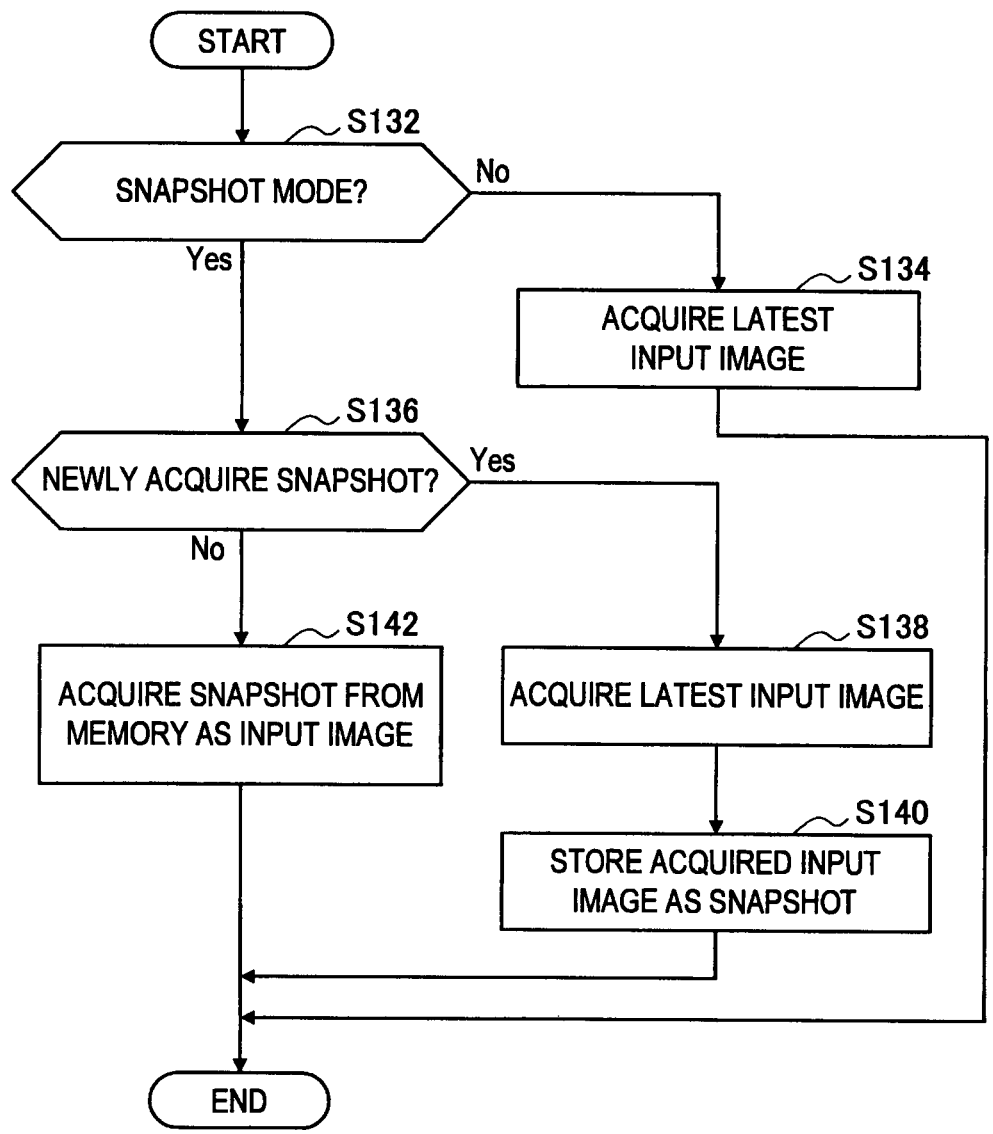
FIG. 13 is a flow chart showing an example of a detailed flow of an image acquisition process according to an embodiment.

FIG. 13 is a flow chart showing an example of a detailed flow of the image acquisition process at step S102 of FIG. 12.

Referring to FIG. 13, the image acquisition unit 110 first determines whether the current mode is the snapshot mode or the real-time mode (step S132). If the current mode here is the real-time mode, the image acquisition unit 110 acquires the latest input image from the imaging unit 102 (step S134). On the other hand, if the current mode is the snapshot mode, the image acquisition unit 110 determines whether or not to newly acquire a snapshot (step S136). For example, in the case the snapshot mode is newly started or refresh of the snapshot is instructed by the user, the image acquisition unit 110 determines that the snapshot is to be newly acquired. If it is determined here that the snapshot is to be newly acquired, the image acquisition unit 110 acquires the latest input image from the imaging unit 102 (step S138), and causes the frame memory 112 to store the acquired input image as the snapshot (step S140). On the other hand, if it is determined that the snapshot does not have to be newly acquired, the image acquisition unit 110 acquires the snapshot stored in the frame memory 112 as the input image (step S142).

4. Operation Scenario

Next, three illustrative scenarios on the operation of the virtual object that may be realized using the terminal device 100 described above will be described.

4-1. First Scenario

Figure 14A:
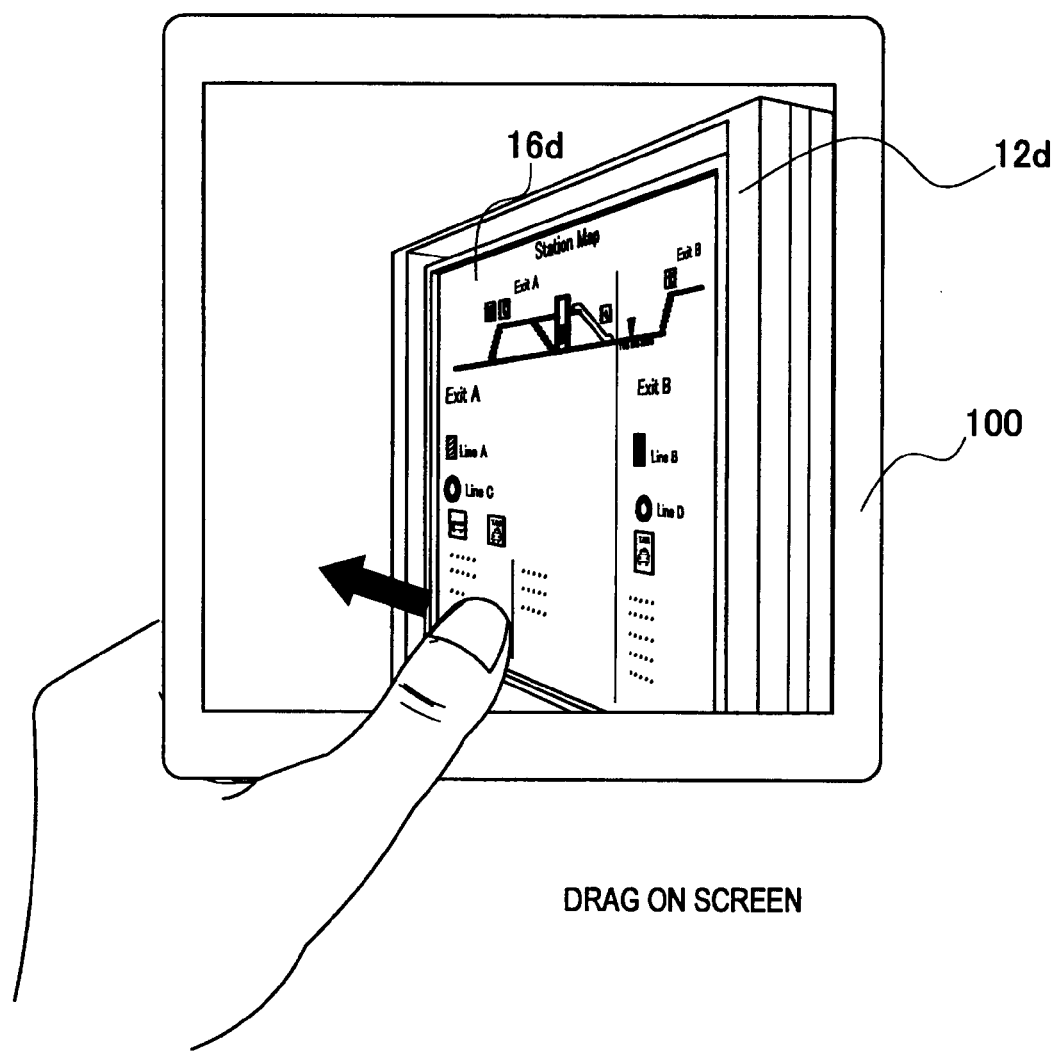
FIG. 14A is a first explanatory diagram for describing a first scenario on operation of a virtual object.
Figure 14B:
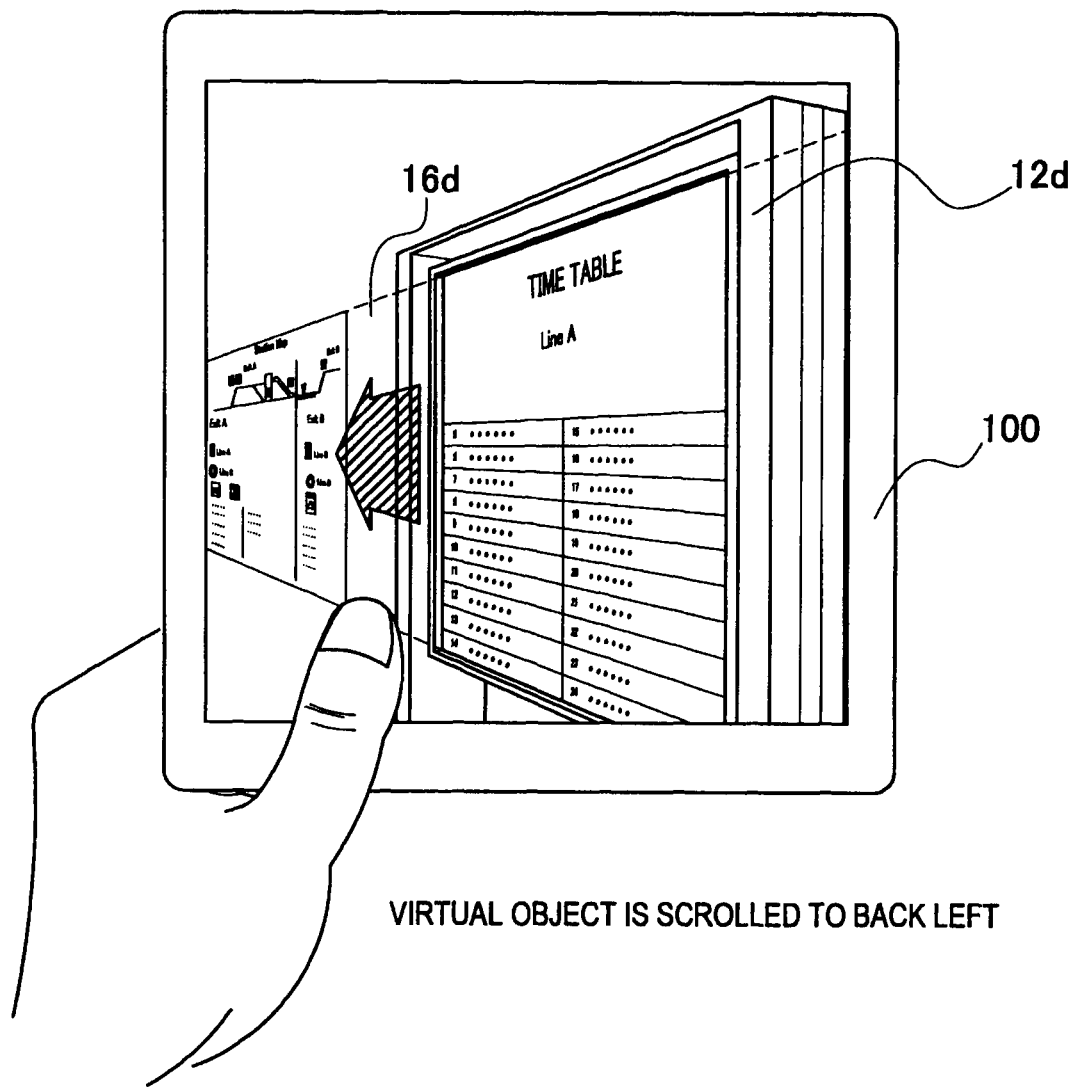
FIG. 14B is another explanatory diagram for describing a first scenario on operation of a virtual object.

FIGS. 14A and 14B are explanatory diagrams for describing a first scenario on the operation of the virtual object.

Referring to FIG. 14A, an image in which a real object 12d existing in the real space is shown is displayed on the screen of the terminal device 100. The real object 12d is an information board installed at a station. When it is recognized by the image recognition unit 130 that the real object 12d is shown in the input image, the data acquisition unit 170 of the terminal device 100 acquires the object data of a virtual object 16d that is associated with the real object 12d. The virtual object 16d is a substantially planar object displaying the map of the station, the exit information, the timetable, or the like, for example. In the example of FIG. 14A, only a part of the virtual object 16d is superimposed onto the real object 12d. The restraint region of the virtual object 16d is a region along the surface of the real object 12d, for example. The restraint region setting unit 140 sets the restraint region of the virtual object 16d based on the position and the attitude of the real object 12d. Then, it is assumed, for example, that the user dragged the real object 12d to the top left (see the arrow in the drawing) on the screen of the terminal device 100.

Referring to FIG. 14B, as a result of the above drag, the virtual object 16d is scrolled toward the back left. Then, the timetable part of the virtual object 16d, which was not displayed before the drag, is superimposed onto the real object 12d.

4-2. Second Scenario

Figure 15A:
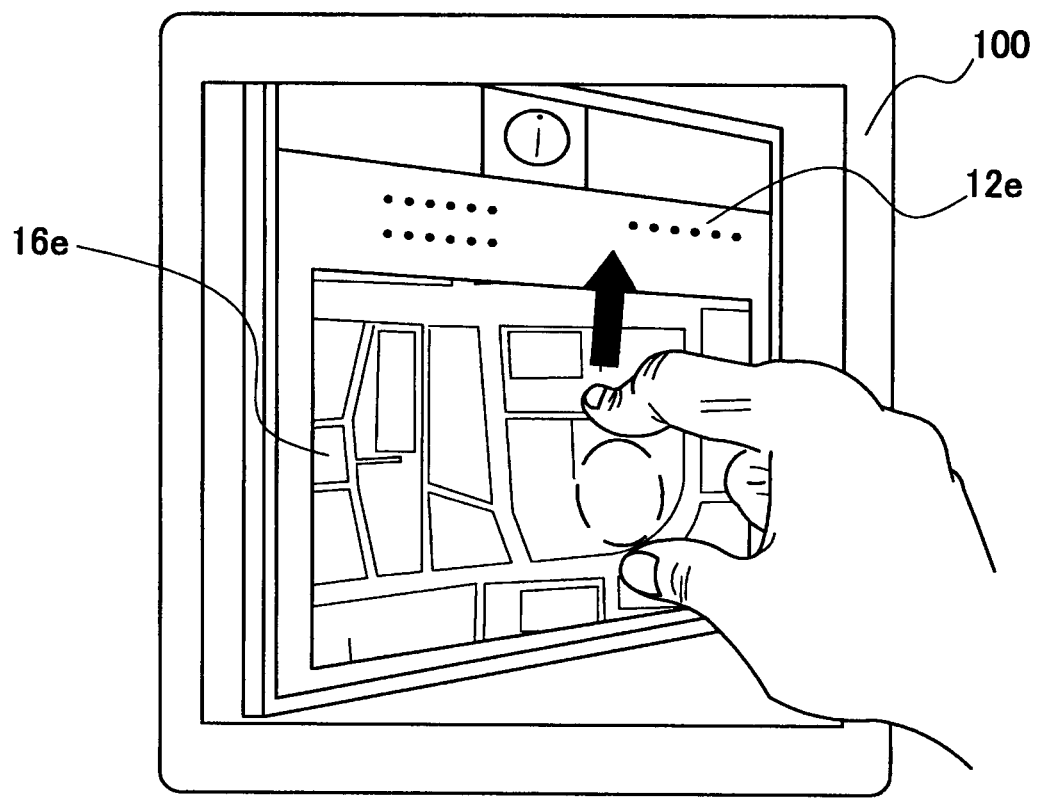
FIG. 15A is a an explanatory diagram for describing a second scenario on operation of a virtual object.
Figure 15B:
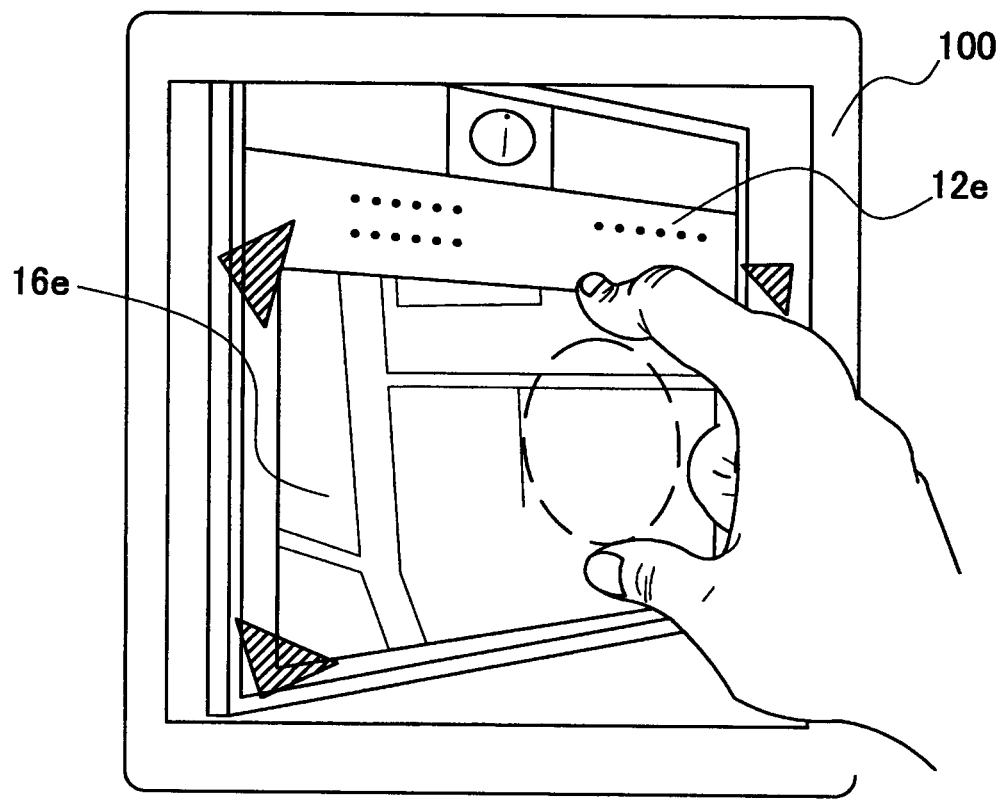
FIG. 15B is a another explanatory diagram for describing a second scenario on operation of a virtual object.

FIGS. 15A and 15B are explanatory diagrams for describing a second scenario on the operation of the virtual object.

Referring to FIG. 15A, an image in which a real object 12e existing in the real space is shown is displayed on the screen of the terminal device 100. The real object 12e is an information board showing a map. When it is recognized by the image recognition unit 130 that the real object 12e is shown in the input image, the data acquisition unit 170 of the terminal device 100 acquires object data of a virtual object 16e that is associated with the real object 12e. The virtual object 16e is a substantially planar object displaying map information, for example. The initial display contents of the map information may be the same as the map that is actually shown on the real object 12e. The restraint region of the virtual object 16e is a region along the surface of the real object 12e, for example. The restraint region setting unit 140 sets the restraint region of the virtual object 16e based on the position and the attitude of the real object 12e. Then, it is assumed, for example, that the user performed a pinch-out at the map portion on the screen of the terminal device 100.

Referring to FIG. 15B, as a result of the above pinch-out, the map displayed by the virtual object 16e is enlarged. Moreover, the map is not simply enlarged on the screen, but is enlarged within the plane that is along the surface of the real object 12e according to the attitude of the real object 12e.

Additionally, for example, the operation control unit 160 may scale the map within the restraint region in the case a pinch-in or a pinch-out is performed at the map portion, and may scale the entire image while keeping it parallel to the image plane in the case a pinch-in or a pinch-out is performed at a portion other than the map portion.

4-3. Third Scenario

Figure 16A:
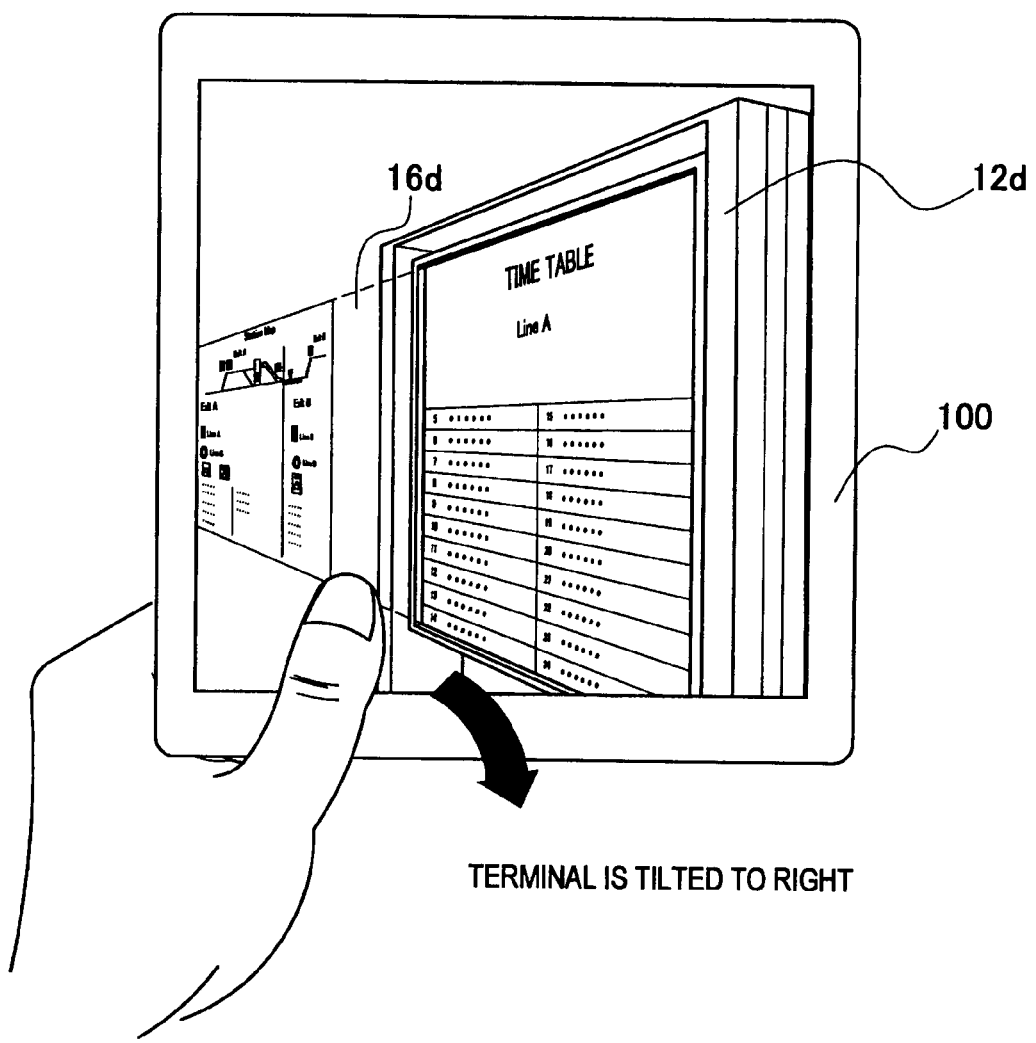
FIG. 16A is an explanatory diagram for describing a third scenario on operation of a virtual object.

Referring to FIG. 16A, the real object 12d and the virtual object 16d displayed on the screen of the terminal device 100 are again shown, as in the example of FIG. 14B. Here, it is assumed, for example, that the user tilted the main body of the terminal device 100 to the right.

Figure 16B:
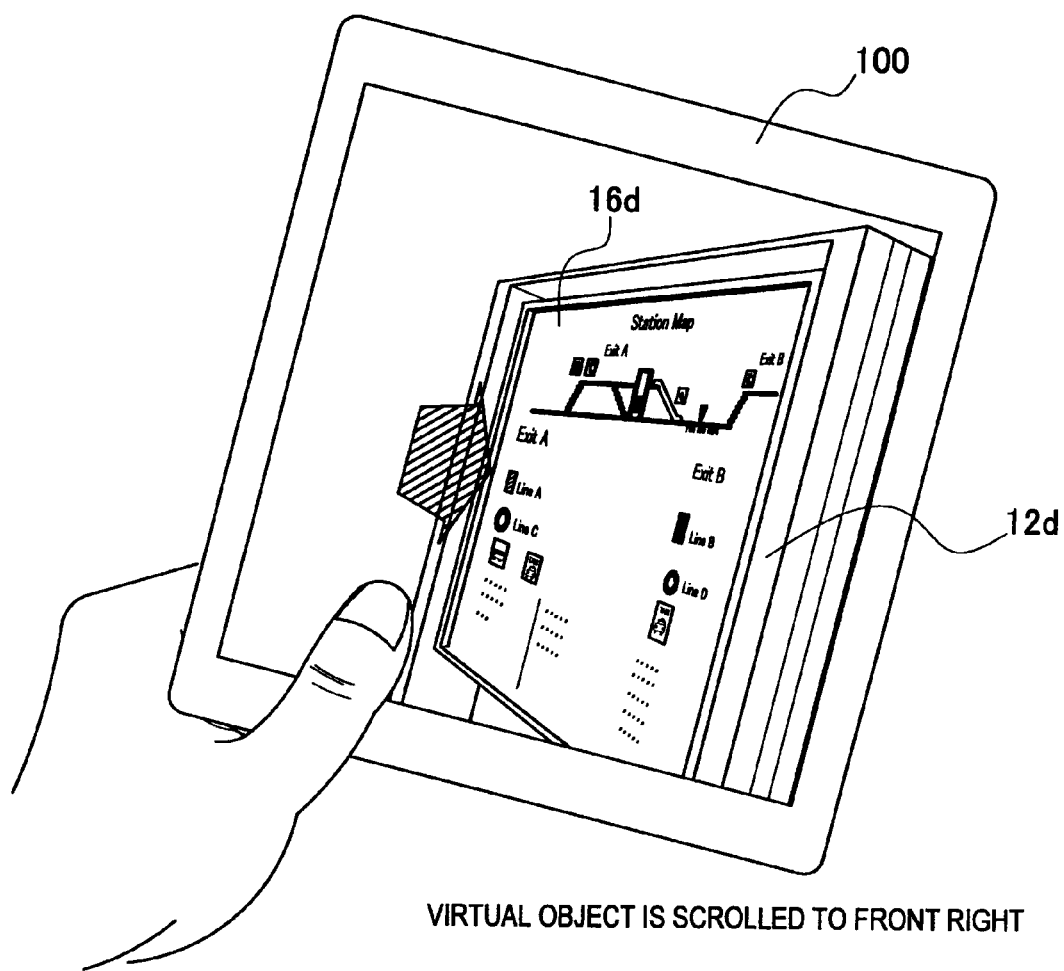
FIG. 16B is another diagram for describing a third scenario on operation of a virtual object.

Referring to FIG. 16B, as a result of the terminal device 100 being tilted, the virtual object 16d is scrolled to the front right. In the example of FIG. 16B, the timetable part of the virtual object 16d, which was superimposed onto the real object 12d, has gone out of the screen, and the exit information part of the virtual object 16d is superimposed onto the real object 12d.

As in the examples of these scenarios, according to the present embodiment, the virtual object does not simply move up and down, and right and left within the screen according to the user input, but may be operated in such a way as if it is moving in the three-directional real space according to the attitude of the associated real object. It is thereby possible to allow the user to operate the AR virtual object without impairing the sense, felt by the user, of being in the augmented real space, that is, the sense of immersion of the user into the AR space.

Additionally, an example where the virtual object is superimposed onto the surface of the real object shown in the input image is mainly described, but the virtual object may be superimposed onto a position separate from the surface of the real object. Also, the display control unit 190 may recognize the surface onto which the virtual object is to be superimposed, according to the texture or the like of the input image. For example, a plane having a uniform texture in the input image, such as the wall of a building, the floor of a passage, or the like, may be recognized as the surface onto which the virtual object is to be superimposed.

4-4. Display of Auxiliary Object

Figure 17:
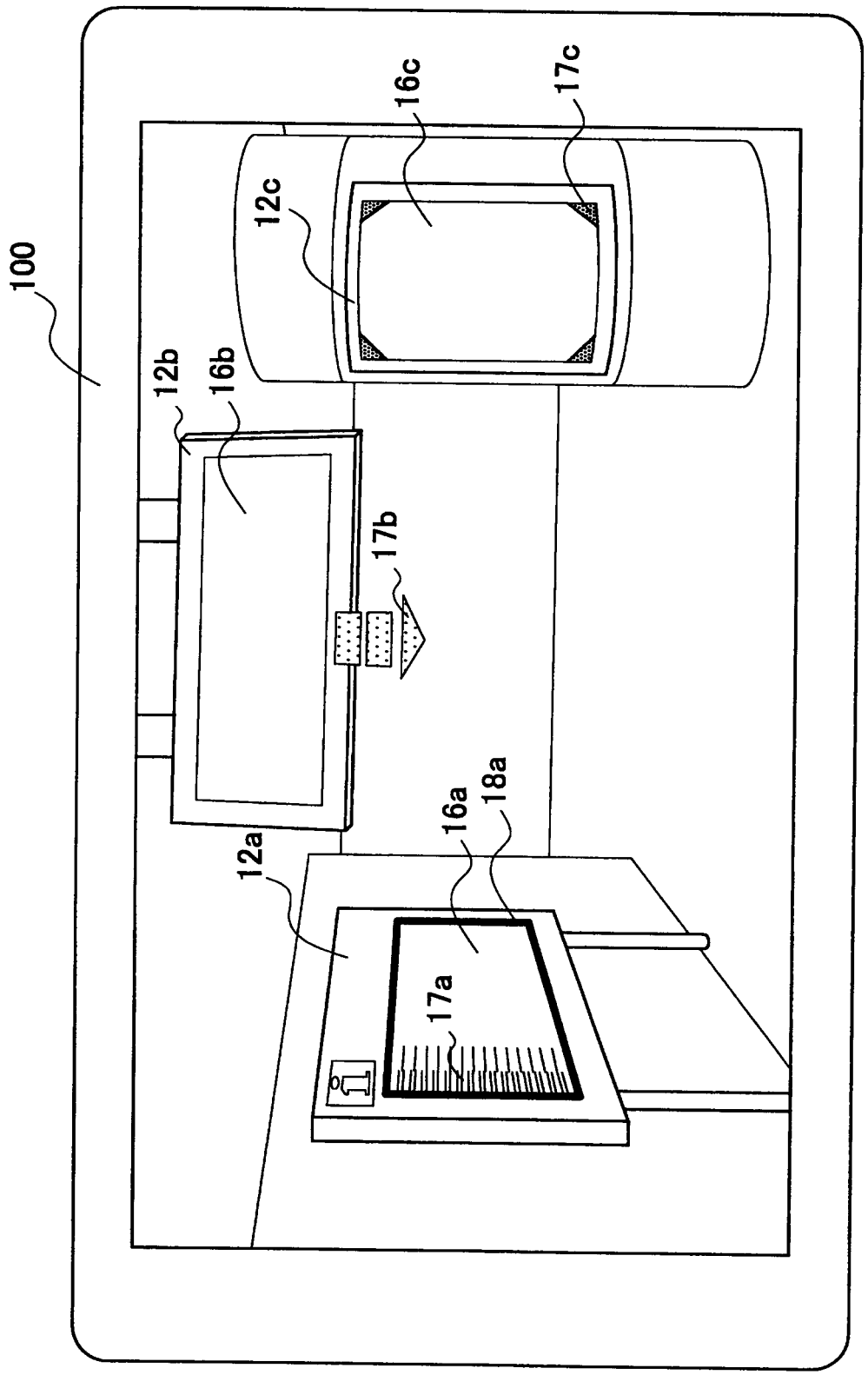
FIG. 17 is an explanatory diagram for describing an auxiliary object showing the movable direction of a virtual object.

FIG. 17 is an explanatory diagram for describing the auxiliary object indicating the movable direction of the virtual object.

Referring to FIG. 17, three real objects, 12a, 12b, and 12c, are displayed on the screen of the terminal device 100. The virtual object 16a is superimposed onto the real object 12a. An auxiliary object 17a (shadow gradation) indicating that the virtual object 16a can be scrolled to the front left is displayed at the left end of the virtual object 16a. Also, the virtual object 16b is superimposed onto the real object 12b. An auxiliary object 17b (arrow) indicating that the virtual object 16b can be scrolled downward is displayed below the virtual object 16b. The virtual object 16c is superimposed onto the real object 12c. Auxiliary objects 17c (triangular catches) indicating that the virtual object 16c can be enlarged along the surface of the real object 12c are superimposed onto the four corners of the virtual object 16c.

As described, by displaying in association with the virtual object the auxiliary object indicating the movable direction of the virtual object, a user can easily grasp how the virtual object can be operated.

Furthermore, in the example of FIG. 17, the virtual object 16a is the virtual object that is positioned nearest to the terminal device 100. An auxiliary object 18a, which is a bold frame, is superimposed onto the virtual object 16a. The auxiliary object 18a is an object indicating a so-called focus. When a certain user input is performed without any of the virtual objects being specified by the user, a focused virtual object may be specified as the operation target by the operation control unit 160.

In the foregoing, the terminal device 100 according to an embodiment has been described in detail with reference to FIGS. 1 to 17. According to this embodiment, the motion of an AR virtual object that is operated according to a user input is determined within the restraint region that is set in the real space based on the attitude of the real object that is recognized in the input image. Accordingly, the virtual object is not operated irrespective of the situation of the real world, but may be operated in such a way as if it is moving three-directionally in accordance with the attitude of the real object existing in the real world. Thus, at the time of operation on the virtual object, natural operation and display can be realized without impairing the sense of immersion of the user into the AR space.

Furthermore, according to the present embodiment, the restraint region may be set along the surface of the real object that is recognized in the input image. Also, the virtual object is a substantially planar object that displays specific information, and it may be moved, scaled, or scrolled along the surface of the real object. Accordingly, the user is allowed to freely view abundant information with a sense of reality, as if directly operating information that is shown on the real object in the real world.

Furthermore, the process by the terminal device 100 described in the present specification may be realized by using any of software, hardware, and a combination of software and hardware. Programs configuring the software are stored in advance in a storage medium provided within or outside the device, for example. Each program is loaded into a RAM (Random Access Memory) at the time of execution, and is executed by a processor such as a CPU (Central Processing Unit), for example.

It should be understood by those skilled in the art that various modifications, combinations, sub-combinations and alterations may occur depending on design requirements and other factors insofar as they are within the scope of the appended claims or the equivalents thereof.

Additionally, the present technology may also be configured as below.

(1)

A terminal device including:

an image acquisition unit for acquiring an input image showing a real space;

a display control unit for superimposing a virtual object onto the input image and displaying the virtual object;

a detection unit for detecting a user input; and an operation control unit for determining a motion of the virtual object which is operated according to the user input, within a region having at most two dimensions that is set within the real space based on an attitude of a real object recognized within the input image.

(2)

The terminal device according to (1), wherein the region is set along a surface of the real object recognized within the input image.

(3)

The terminal device according to (2), wherein the virtual object is a substantially planar object displaying specific information, and wherein the motion of the virtual object is movement, scaling, or scrolling of the virtual object.

(4)

The terminal device according to (2) or (3), wherein the detection unit detects a user input to a screen displaying the virtual object, and wherein the operation control unit calculates a position, within the region, corresponding to an input position on the screen, and determines the motion of the virtual object based on the calculated position.

(5)

The terminal device according to (4), wherein the detection unit detects a drag on the screen as the user input, and wherein the operation control unit changes, according to a distance between the terminal device and the region, a proportion of an amount of the motion of the virtual object to an amount of dragging on the screen.

(6)

The terminal device according to (2) or (3), wherein the detection unit detects, using a sensor, a motion of the terminal device as the user input, and wherein the operation control unit calculates a second vector, within the region, corresponding to a first vector indicating the motion of the terminal device, and determines the motion of the virtual object based on the calculated second vector.

(7)

The terminal device according to any of (1) to (6), wherein the display control unit further superimposes onto the input image an auxiliary object indicating a movable direction of the virtual object within the region.

(8)

The terminal device according to any of (1) to (7), wherein the image acquisition unit acquires a snapshot captured by an imaging device as the input image, in a case a predetermined user input is detected, and wherein the display control unit expresses, on the snapshot, the motion of the virtual object.

(9)

An object control method performed by a terminal device that acquires an input image showing a real space and that superimposes a virtual object onto the input image and displays the virtual object, including:

detecting a user input; and determining a motion of the virtual object which is operated according to the user input, within a region having at most two dimensions that is set within the real space based on an attitude of a real object recognized within the input image.

(10)

A program for causing a computer for controlling a terminal device that acquires an input image showing a real space and that superimposes a virtual object onto the input image and displays the virtual object to function as:

a detection unit for detecting a user input; and an operation control unit for determining a motion of the virtual object which is operated according to the user input, within a region having at most two dimensions that is set within the real space based on an attitude of a real object recognized within the input image.

What is claimed is:

1. An apparatus comprising:

a memory storing instructions; and a control unit executing the instructions to:

detect an object of interest within an image of real space;

detect an orientation and a position of the object;

generate a modified image, the generating comprising:

determining a region of the image of real space based on the detected orientation and position;

display a virtual image of the object in the region;

change the virtual image based on a detected user input, the changed virtual image being maintained within the region; and
display the modified image.

2. The apparatus of claim 1, wherein determining a region of the image of real space further comprises:
requesting that a remote server determine the region of the image of real space; and
receiving an indication of a determined region from the remote server.

3. The apparatus of claim 1, wherein detecting an object of interest further comprises:
requesting that a remote server detect the object of interest; and
receiving an indication of a detected object of interest from the remote server.

4. The apparatus of claim 1, wherein detecting an orientation and a position of the object further comprises:
requesting that a remote server detect an orientation and a position of the object; and
receiving an indication of a detected orientation and a position of the object from the remote server.

5. The apparatus of claim 1, wherein changing the virtual image based on a detected user input further comprises:
detecting the user input;
requesting that a remote server change the virtual image based on the detected user input; and
receiving an indication of a changed the virtual image from the remote server.

6. The apparatus of claim 1, wherein determining a region of the image of real space further comprises:
determining a surface of the object of interest based on the detected orientation and position; and
projecting the region onto a portion of the determined surface.

7. The apparatus of claim 1, wherein:
the virtual image comprises a collection of information; and
displaying the virtual image further comprises displaying pages of the information in the region.

8. The apparatus of claim 7, wherein changing the virtual image based on a detected user input comprises scrolling the pages of the collection of information.

9. The apparatus of claim 7, wherein changing the virtual image based on a detected user input comprises scaling at least one of the pages of the collection of information.

10. The apparatus of claim 1, wherein:
the user input specifies an input position; and
changing the virtual image further comprises projecting the input position onto the virtual image.

11. The apparatus of claim 10, wherein the projected input position selects a portion of the virtual image.

12. The apparatus of claim 11, wherein selecting the portion of the virtual image provides the user with additional information received from a server.

13. The apparatus of claim 10, wherein the user specifies the input position via a touch panel.

14. The apparatus of claim 1, wherein the instructions further comprise instructions for:
determining a possible change of the virtual image based on the region; and
superimposing onto the virtual image an indication of the possible change.

15. The apparatus of claim 14, wherein the possible change comprises at least one of: re-sizing the virtual image, moving the virtual image, and changing information displayed in the virtual image.

16. The apparatus of claim 1, wherein the modified image further comprises a still image of real space.

17. The apparatus of claim 16, wherein the image of real space is selected from among a plurality of candidate still images of real space.

18. The apparatus of claim 1, wherein the image of real space is a live image of real space.

19. The apparatus of claim 1, wherein the virtual image comprises at least one of a graphic and an information directly associated with the object of interest.

20. The apparatus of claim 1, wherein the modified image is displayed within the determined region of the image of real space, and all portions of the modified image which are displayed are those that are maintained within the region.

21. A method comprising:
detecting an object of interest within an image of real space;
detecting an orientation and a position of the object;
generating a modified image, the generating comprising:
determining a region of the image of real space based on the detected orientation and position;
display a virtual image of the object in the region;
change the virtual image based on a detected user input, the changed virtual image being maintained within the region; and
displaying the modified image.

22. A tangibly embodied non-transitory computer-readable medium storing instructions which, when executed by a processor, perform a method comprising:
detecting an object of interest within an image of real space;
detecting an orientation and a position of the object;
generating a modified image, the generating comprising:
determining a region of the image of real space based on the detected orientation and position;
display a virtual image of the object in the region;
change the virtual image based on a detected user input, the changed virtual image being maintained within the region; and
displaying the modified image.

* * * * *